(12) United States Patent
Usami

(10) Patent No.: US 6,821,459 B1
(45) Date of Patent: Nov. 23, 2004

(54) INFORMATION-RECORDING MEDIUM AND METHOD FOR PRODUCING THE SAME

(75) Inventor: Yoshihisa Usami, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 262 days.

(21) Appl. No.: 09/684,634

(22) Filed: Oct. 10, 2000

(30) Foreign Application Priority Data

Oct. 7, 1999 (JP) .......................................... 11-287352
Oct. 7, 1999 (JP) .......................................... 11-287387

(51) Int. Cl.[7] .............................................. B29D 11/00
(52) U.S. Cl. ...................... 264/1.33; 34/312; 264/232; 264/340
(58) Field of Search ................................ 264/1.33, 1.7, 264/2.6, 348, 340, 232; 425/810; 156/155, 245; 34/312, 380; 427/162

(56) References Cited

U.S. PATENT DOCUMENTS

| | | | |
|---|---|---|---|
| 4,954,380 A | * | 9/1990 | Kanome et al. |
| 5,585,063 A | * | 12/1996 | Slater et al. |
| 5,705,223 A | | 1/1998 | Bunkofske |
| 5,858,414 A | * | 1/1999 | Hayashi et al. |
| 6,132,545 A | * | 10/2000 | Motokawa et al. |
| 6,197,477 B1 | * | 3/2001 | Satoh et al. |

FOREIGN PATENT DOCUMENTS

| | | | | |
|---|---|---|---|---|
| EP | 0 968 769 A2 | 1/2000 | | |
| JP | 2-300288 | 12/1990 | ........... | C09K/15/20 |
| JP | 3-32882 | * 2/1991 | | |
| JP | 3-224793 | 10/1991 | ............ | B41M/5/26 |
| JP | 4-146189 | 5/1992 | ............ | B41M/5/26 |
| JP | 6-150371 | 5/1994 | ............ | G11B/7/24 |
| WO | WO 99/14748 A | 3/1999 | | |

OTHER PUBLICATIONS

IBM Technical Bulletin, vol. 29, Issue 10, p. 4259, published Mar. 1, 1987.*
Copy of Partial European Search Report on a counterpart European Application.
English Abstract of JP 04–102245, Publication Date Apr. 3, 1992.
English Abstract of JP 01–128231, Publication Date May 19, 1989.
Patent abstract of Japan 06150371 A May 31, 1994.
Patent abstract of Japan 02300288 A Dec. 12, 1990.
Patent abstract of Japan 03224793 A Oct. 3, 1991.
Patent abstract of Japan 04146189 A May 20, 1992.

* cited by examiner

Primary Examiner—Mathieu D. Vargot
(74) Attorney, Agent, or Firm—Sughrue Mion, PLLC

(57) ABSTRACT

Disclosed is a method for producing an information-recording medium comprising, on a substrate, a dye recording layer capable of recording information, the method comprising the step of drying the substrate formed with the dye recording layer by allowing clean air to flow while rotating the substrate at a high speed; wherein an intake for introducing the clean air is narrowed by arranging a lid having a circular opening at a central portion, at an opening disposed at an upper portion of an apparatus for rotating the substrate at the high speed.

6 Claims, 24 Drawing Sheets

FIG. 18

|  | WORKING EXAMPLE 1 | WORKING EXAMPLE 2 | COMPARATIVE EXAMPLE 1 | COMPARATIVE EXAMPLE 2 |
|---|---|---|---|---|
| DRYING TIME (s) | 10 | 11 | 16 | 18 |
| FILM THICKNESS DISTRIBUTION RATIO FOR INNER AND OUTER CIRCUMFERENTIAL SURFACES (%) | ±3 | ±2 | ±5 | ±5 |

INFORMATION-RECORDING MEDIUM AND METHOD FOR PRODUCING THE SAME

BACKGROUND OF THE INVENTION

1. Field of the Invention

The present invention relates to an information-recording medium having, on a substrate, a recording layer capable of recording information, and a method for producing the same.

2. Description of the Related Art

In general, the optical information-recording medium (optical disk) capable of recording information only once by using the laser beam includes, for example, write-once type CD (so-called CD-R) and DVD-R. Such an optical information-recording medium is advantageous in that a small amount of CD's can be commercially supplied to the market quickly at a convenient price as compared with the production of conventional CD (compact disk). The demand for such an optical information-recording medium is increasing in accordance with the recent popularization of personal computers or the like.

The optical information-recording medium of the CD-R type has a representative structure comprising a recording layer composed of an organic dye, a light-reflective layer composed of a metal such as gold, and a protective layer made of a resin which are stacked in this order on a transparent disk-shaped substrate having a thickness of about 1.2 mm (see, for example, Japanese Laid-Open Patent Publication No. 6-150371).

The optical information-recording medium of the DVD-R type has a structure comprising two disk-shaped substrates (having a thickness of about 0.6 mm) which are laminated with each other with respective information-recording surfaces disposed inwardly in an opposing manner. The optical information-recording medium of this type has such a feature that a large amount of information is recorded thereon.

Information is written (recorded) on the optical information-recording medium by radiating a near infrared laser beam (laser beam usually having a wavelength of about 780 nm in the case of CD-R or a wavelength of about 635 nm in the case of DVD-R). A portion of the dye recording layer, which is irradiated with the laser beam, absorbs the light, and its temperature is locally raised. As a result, a physical or chemical change (for example, generation of pit) takes place, and the optical characteristic is changed. Thus, the information is recorded.

On the other hand, information is also read (reproduced) by radiating a laser beam usually having the same wavelength as that of the recording laser beam. The information is reproduced by detecting the difference in reflectance between a portion (recorded portion based on the generation of pit) which has subjected to the change in optical characteristic of the dye recording layer and a portion (non-recorded portion) which is not subjected to the change.

In general, the disk-shaped optical information-recording medium, on which the information signal is recorded and reproduced by the aid of the light beam, includes read-only type optical disks referred to as so-called compact disk, write-once type optical disks capable of recording only once, and rewritable optical disks capable of not only reproduction but also recording and erasing of the information signal.

Polycarbonate resin or acrylic resin is generally used as a material for the substrate for the optical disk as described above. In view of the productivity, the substrate is produced by using the injection molding method or the injection compression molding method. After the molding treatment is applied, the substrate is cooled, and it is transported to the dye recording layer-forming step.

In the method for producing the optical information-recording medium as described above, when the recording layer based on the organic dye is formed on the substrate, the dye solution is applied onto the substrate while rotating the substrate. After the dye solution is applied, the clean air is allowed to flow toward the recording layer while rotating the substrate at a high speed so that the recording layer is dried.

In this case, when the intake for introducing the clean air is wide, a larger amount of clean air flows toward the outer circumferential portion of the recording layer as compared with the inner circumferential portion thereof. For this reason, the outer circumferential portion is dried without sufficiently blowing off the excessive dye solution, as compared with the inner circumferential portion. As a result, a problem arises such that the film thickness is non-uniform between the outer circumferential portion and the inner circumferential portion, and the recording characteristic is deteriorated.

In order to improve the throughput of the information-recording medium, the drying time is shortened by increasing the environmental temperature for drying the recording layer or the temperature of the substrate itself, rotating the substrate at a higher speed by increasing the concentration of the dye solution, or increasing the air blow speed during the drying. However, the method as described above involves such a problem that the running cost is expensive.

In the method for producing the optical information-recording medium as described above, two or more dye application mechanisms for forming the dye recording layer are installed for one molding machine for molding the substrate. That is, when two or more substrate-molding machines are installed, four or more dye application mechanisms are installed. The dye recording layer is hitherto formed with a plurality of production lines. For this reason, the maintenance cost for the respective equipments is expensive, and the quality control for each of the production lines is complicated, resulting in the large scale of the production equipment, and the enlargement of the installation space. In accordance therewith, it is feared that the price of the optical information-recording medium to be produced may become high, and the yield may be lowered.

SUMMARY OF THE INVENTION

The present invention has been made taking the foregoing problems into consideration, an object of which is to provide an information-recording medium and a method for producing the same which make it possible to reduce the drying time for a recording layer, obtain a uniform film thickness of the recording layer, and improve the throughput for the information-recording medium at low cost.

Another object of the present invention is to provide an information-recording medium and a method for producing the same which make it possible simplify the production line by satisfying a relationship of n/m<2 provided that m represents the number of substrate-molding machine or machines and n represents the number of dye application mechanism or mechanisms for forming a dye recording layer wherein the quality control is easily performed and the maintenance cost is reduced, making it possible to realize a small scale of the production equipment and reduce the installation space so that the low price of the information-recording medium produced thereby may be realized and the improvement in yield may be achieved.

According to the present invention, there is provided an information-recording medium comprising, on a substrate, a recording layer capable of recording information; wherein the recording layer is dried by rotating the substrate at a high speed and allowing clean air to flow through an intake which is formed to be narrow, toward the recording layer formed on the substrate.

According to another aspect of the present invention, there is provided a method for producing an information-recording medium comprising, on a substrate, a recording layer capable of recording information, the method comprising the step of drying the recording layer by rotating the substrate at a high speed and allowing clean air to flow toward the recording layer formed on the substrate; wherein an intake for introducing the clean air is formed to be narrow.

In the method for producing the information-recording medium described above, it is also preferable that the intake is narrowed by arranging a disk-shaped lid having an opening at least at a central portion, on the intake for introducing the clean air. Alternatively, the opening may have a wedge-shaped configuration or a substantially rhombic configuration.

It is also preferable that the lid has a first opening which has a large diameter disposed at a central portion, and it has a plurality of second openings which have diameters gradually decreased for those disposed in a direction toward an outer circumference in which a central angle resides in a spacing distance of not less than 10°.

It is also preferable that the lid is formed to have a substantially conical configuration which has a diameter continuously decreased downwardly, and it has an opening at a central portion. Alternatively, the lid may have a plurality of fins which are formed at a lower surface in which a central angle resides in a spacing distance of not less than 10°.

Accordingly, the clean air can be allowed to flow toward the entire surface of the recording layer substantially uniformly. Therefore, the recording layer can be dried uniformly concerning the planar direction and the film thickness direction of the recording layer. Thus, it is possible to produce the information-recording medium having good recording characteristics.

Further, the drying time for the recording layer can be shortened without increasing the environmental temperature for drying the recording layer or the temperature of the substrate itself, without rotating the substrate at a higher speed by increasing the concentration of the dye solution, or without increasing the air blow speed during the drying. Therefore, it is possible to remarkably suppress the increase in running cost. Further, it is possible to improve the throughput of the information-recording medium.

According to still another aspect of the present invention, there is provided an information-recording medium comprising, on a substrate, a dye recording layer capable of recording information; wherein the information-recording medium is produced by constructing a production line so that a relationship of n/m<2 is satisfied provided that m represents a number of molding machine or machines for molding the substrate, and n represents a number of dye application mechanism or mechanisms for forming the dye recording layer.

According to still another aspect of the present invention, there is provided a method for producing an information-recording medium comprising, on a substrate, a dye recording layer capable of recording information; wherein a production line is constructed so that a relationship of n/m<2 is satisfied provided that m represents a number of molding machine or machines for molding the substrate, and n represents a number of dye application mechanism or mechanisms for forming the dye recording layer. In this aspect, it is preferable that the production line is constructed by installing one dye application mechanism for forming the dye recording layer for one molding machine for molding the substrate.

Accordingly, it is possible to simplify the production line, and it is easy to perform the quality control for each production line. Further, the maintenance cost for each equipment can be reduced, making it possible to realize a small scale of the production equipment and reduce the installation space. Therefore, it is possible to realize the low price of the information-recording medium produced thereby, and it is possible to achieve the improvement in yield.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 18 shows a table illustrating results of an exemplary experiment to investigate the drying time and the film thickness distribution ratio obtained when the shape of the lid is changed;

DESCRIPTION OF THE PREFERRED EMBODIMENTS

Figure 1:
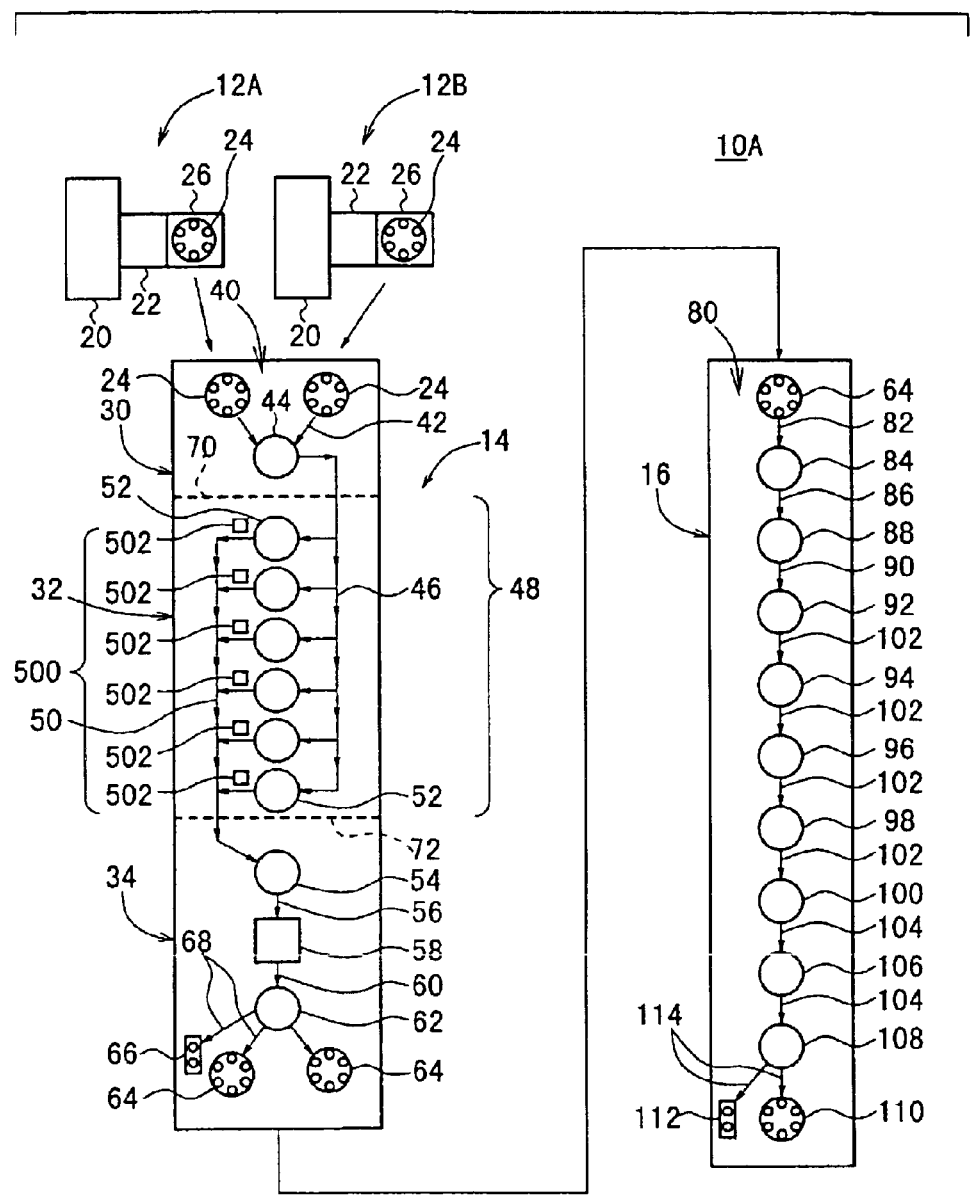
FIG. 1 shows an arrangement of an exemplary production system according to a first embodiment.

As shown in FIG. 1, a production system 10A according to a first embodiment of the present invention comprises two molding equipments (first and second molding equipments) 12A, 12B for producing substrates by means of, for example, injection molding, compression molding, or injection compression molding, an application equipment 14 for forming a dye recording layer on the substrate by applying a dye solution onto a first principal surface of the substrate followed by drying, and an aftertreatment equipment 16 for forming a light-reflective layer on the dye recording layer of the substrate by means of, for example, sputtering, and then applying a UV-curable solution onto the light-reflective layer, followed by UV irradiation to form a protective layer on the light-reflective layer.

Each of the first and second molding equipments 12A, 12B includes a molding machine 20 for performing injection molding, compression molding, or injection compression molding of a resin material such as polycarbonate to produce the substrate formed, on the first principal surface, with a tracking groove or irregularity (groove) to indicate information such as an address signal, a cooling section 22 for cooling the substrate taken out of the molding machine 20, and a stacking section 26 (stack pole rotary table) installed with a plurality of stack poles 24 for stacking and storing the substrates after being cooled.

The application equipment 14 comprises three process units 30, 32, 34. The first process unit 30 includes a stack pole-accommodating section 40 for accommodating the stack pole 24 transported from the first and second molding equipments 12A, 12B, a first transport mechanism 42 for extracting the substrate one by one from the stack pole 24 accommodated in the stack pole-accommodating section 40 to transport the substrate to the next step, and an electrostatic blow mechanism 44 for removing static electricity from one substrate transported by the first transport mechanism 42.

The second process unit 32 includes a second transport mechanism 46 for successively transporting, to the next step, the substrate completed for the electrostatic blow treatment in the first process unit 30, a dye application mechanism 48 for applying a dye solution to a plurality of substrates transported by the second transport mechanism 46 respectively, a substrate-drying mechanism 500 for drying the substrate completed for the dye application treatment, and a third transport mechanism 50 for transporting the substrate completed for the drying treatment one by one to the next step. The dye application mechanism 48 comprises six spin coat apparatuses 52. The substrate-drying mechanism 500 comprises six application solution-drying apparatuses 502. Each of the application solution-drying apparatuses 502 is arranged to form a pair with each of the spin coat apparatuses 52.

The third process unit 34 comprises a back surface-washing mechanism 54 for washing the back surface of one substrate transported by the third transport mechanism 50, a fourth transport mechanism 56 for transporting, to the next step, the substrate completed for the back surface washing, a numbering mechanism 58 for stamping a lot number or the like on the substrate transported by the fourth transport mechanism 56, a fifth transport mechanism 60 for transporting, to the next step, the substrate completed for the stamping of the lot number or the like, an inspecting mechanism 62 for inspecting the presence or absence of any defect and the film thickness of the dye recording layer of the substrate transported by the fifth transport mechanism 60, and a sorting mechanism 68 for sorting the substrates into those to be stacked on a stack pole 64 for normal products and those to be stacked on a stack pole 66 for NG depending on a result of inspection performed by the inspecting mechanism 62.

A first partition plate 70 is installed between the first process unit 30 and the second process unit 32. A second partition plate 72 is installed as well between the second process unit 32 and the third process unit 34 in the same manner as described above. An opening (not shown), which has a size of such a degree that the transport passage for the substrate transported by the second transport mechanism 46 is not closed, is formed at a lower portion of the first partition plate 70. An opening (not shown), which has a size of such a degree that the transport passage for the substrate transported by the third transport mechanism 50 is not closed, is formed at a lower portion of the second partition plate 72.

The aftertreatment equipment 16 includes a stack pole-accommodating section 80 for accommodating the stack pole 64 for normal products transported from the application equipment 14, a sixth transport mechanism 82 for extracting the substrate one by one from the stack pole 64 accommodated in the stack pole-accommodating section 80 and transporting the substrate to the next step, a first electrostatic blow mechanism 84 for removing static electricity from one substrate transported by the sixth transport mechanism 82, a seventh transport mechanism 86 for successively transporting the substrate completed for the electrostatic blow treatment to the next step, a sputtering mechanism 88 for forming, by means of sputtering, a light-reflective layer on the first principal surface of the substrate transported by the seventh transport mechanism 86, an eighth transport mechanism 90 for successively transporting the substrate completed for the sputtering of the light-reflective layer to the next step, and an edge-washing mechanism 92 for washing the circumferential edge (edge portion) of the substrate transported by the eighth transport mechanism 90.

The aftertreatment equipment 16 further includes a second electrostatic blow mechanism 94 for removing static electricity from the substrate completed for the edge washing treatment, a UV-curable solution-applying mechanism 96 for applying a UV-curable solution to the first principal surface of the substrate completed for the electrostatic blow treatment, a spin mechanism 98 for rotating, at a high speed, the substrate completed for the application of the UV-curable solution to obtain a uniform application thickness of the UV-curable solution on the substrate, a UV-radiating mechanism 100 for radiating ultraviolet light onto the substrate completed for the application of the UV-curable solution and the spin treatment so that the UV-curable solution is cured to form a protective layer on the first principal surface of the substrate, a ninth transport mechanism 102 for transporting the substrate to the second electrostatic blow mechanism 94, the UV-curable solution-applying mechanism 96, the spin mechanism 98, and the UV-radiating mechanism 100 respectively, a tenth transport mechanism 104 for transporting the substrate irradiated with UV to the next step, a defect-inspecting mechanism 106 for inspecting the defect of the applied surface and the protective layer surface of the substrate transported by the tenth transport mechanism 104, a characteristic-inspecting mechanism 108 for inspecting the signal characteristic based on the groove formed on the substrate, and a sorting mechanism 114 for sorting the substrates into those to be stacked on a stack pole 110 for normal products and those to be stacked on a stack pole 112 for NG depending on a result of inspection performed by the defect-inspecting mechanism 106 and the characteristic-inspecting mechanism 108.

The arrangement of one of the spin coat apparatuses 52 and one of the application solution-drying apparatuses 502 will now be explained with reference to FIGS. 2 to 6B.

Figure 2:
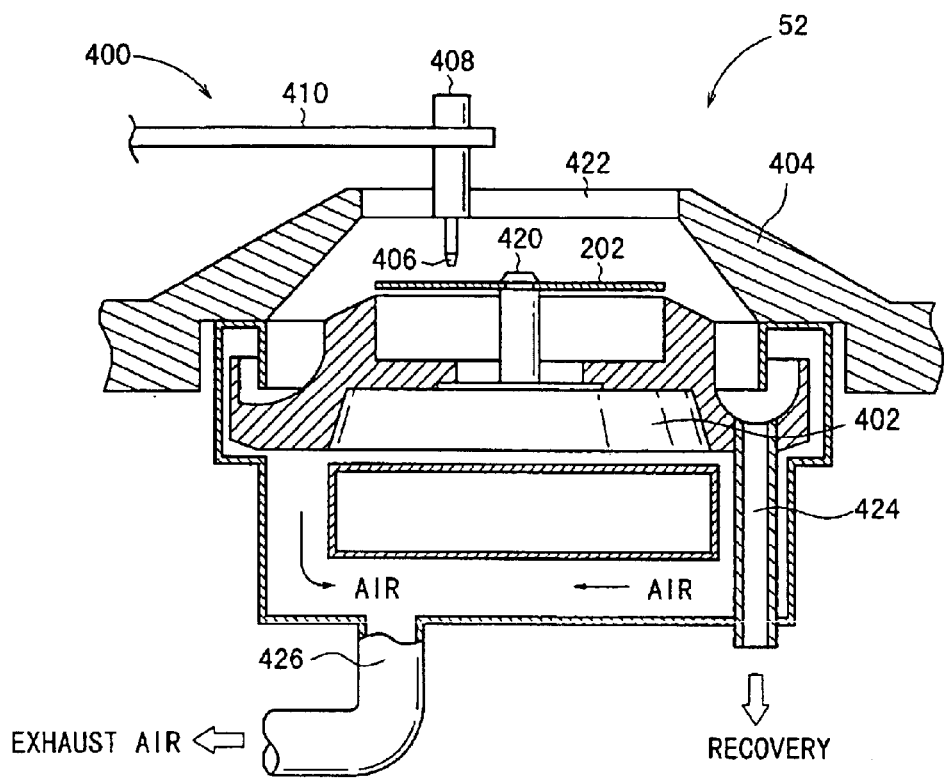
FIG. 2 shows an arrangement of a spin coat apparatus installed in an application equipment.
Figure 3:
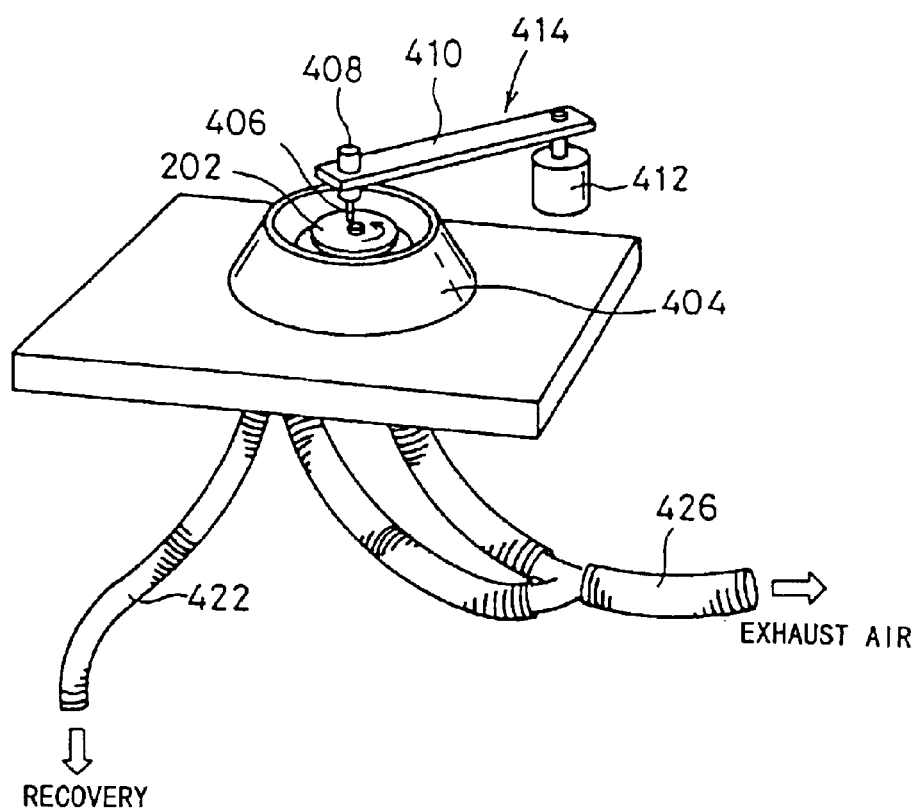
FIG. 3 shows a perspective view illustrating the spin coat apparatus.

As shown in FIGS. 2 and 3, the spin coat apparatus 52 comprises an application solution-feeding apparatus 400, a spinner head apparatus 402, and a scattering-preventive wall 404. The application solution-feeding apparatus 400 comprises a pressurizing tank (not shown) filled with the dye solution, a pipe (not shown) arranged to extend from the pressurizing tank to a nozzle 406, a discharge amount-adjusting valve 408 for adjusting the amount of the dye solution discharged from the nozzle 406. A predetermined amount of the dye solution is dripped onto the surface of the substrate 202 through the nozzle 406.

The application solution-feeding apparatus 400 is arranged to be capable of making swinging movement from a waiting position to a position over the substrate 202 by the aid of a handling mechanism 414 comprising a support plate 410 for supporting the nozzle 406 directed downwardly and a motor 412 for swinging the support plate 410 in the horizontal direction.

The spinner head apparatus 402 is arranged under the application solution-feeding apparatus 400. The substrate 202 is held horizontally by the aid of a detachable fixture 420, and it is possible to make rotation around the axis by the aid of a driving motor (not shown).

The dye solution is dripped from the nozzle 406 of the application solution-feeding apparatus 400 onto the substrate 202 which is rotated in a state of being horizontally held by the spinner head apparatus 402. The dye solution is subjected to casting toward the outer circumferential side on the surface of the substrate 202. An excessive amount of the dye solution is separated off from the outer circumferential edge of the substrate 202, and it is discharged toward the outside.

The scattering-preventive wall 404 is provided around the spinner head apparatus 402 in order that the excessive amount of the dye solution discharged toward the outside from the outer circumferential edge of the substrate 202 is prevented from scattering to the surroundings. An opening 422 is formed at an upper portion of the scattering-preventive wall 404. The excessive amount of the dye solution, which is gathered by the aid of the scattering-preventive wall 404, is recovered through a drain 424.

After the dye solution from the nozzle 406 is applied onto the substrate 202, the drying treatment is started for the dye solution.

Figure 4:
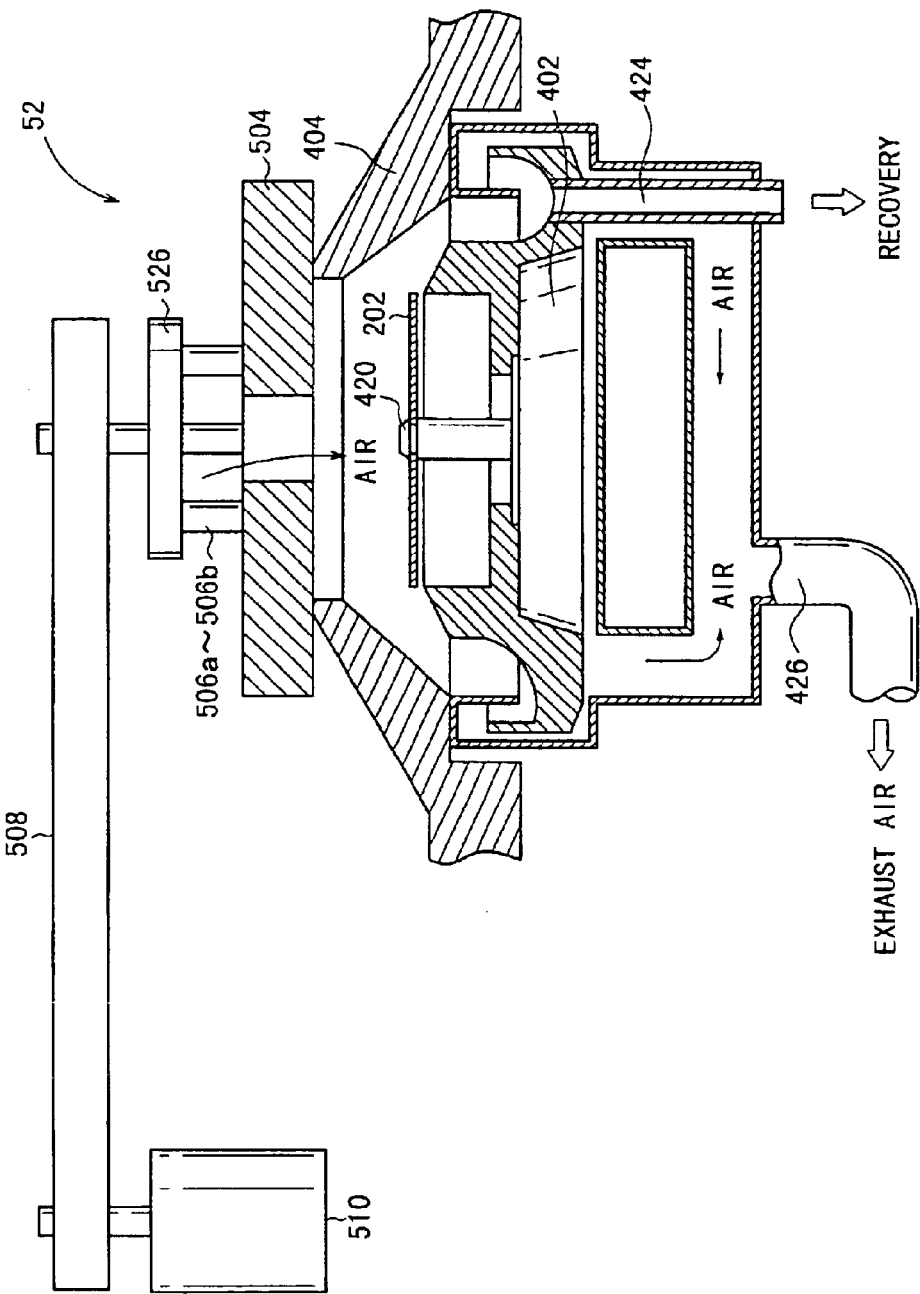
FIG. 4 shows a lateral sectional view illustrating a state in which a lid is arranged on an opening of the spin coat apparatus.

As shown in FIG. 4, the application solution-drying apparatus 502 functions such that a disk-shaped lid 504, which is provided with an opening 512 at a central portion, is arranged on the opening 422 which is provided at the upper portion of the scattering-preventive wall 404. When the disk-shaped lid 504 is arranged, the clean air is introduced through the opening 512 having an opening area which is smaller than that of the opening 422.

Figure 5:
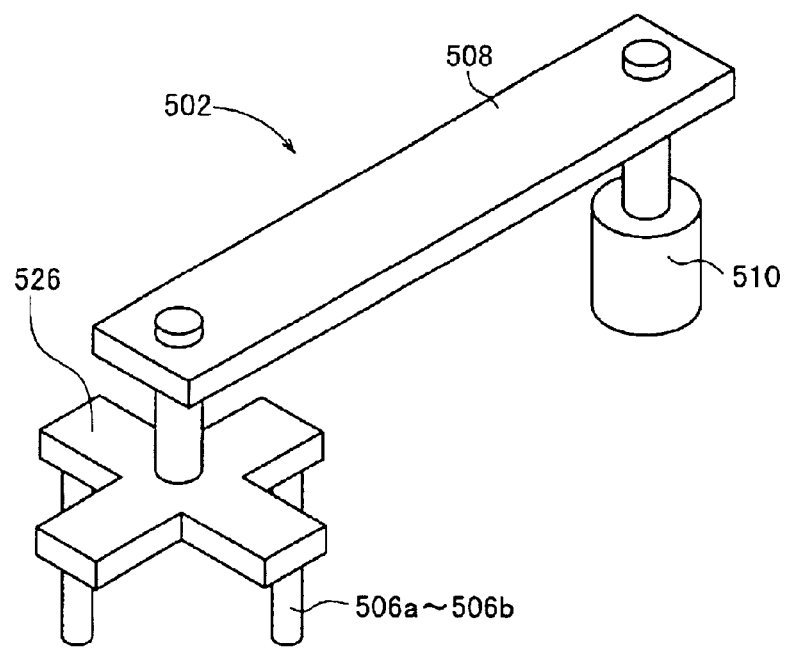
FIG. 5 shows a perspective view illustrating an application solution-drying apparatus installed for a substrate-drying mechanism.

Specifically, as shown in FIGS. 4 and 5, the application solution-drying apparatus 502 comprises four suction pads 506a to 506d for holding, by means of vacuum attraction, the disk-shaped lid 504 to be arranged on the opening 422, a support member 526 to which the suction pads 506a to 506d are attached, an arm 508 having its forward end to which the support member 526 is attached, and a driving motor 510 for swinging the arm 508 in the horizontal direction.

The lid 504, which is held by the suction pads 506a to 506d, is operated as follows. That is, when the driving motor 510 is driven, then the arm 508 makes swinging movement, and it is moved from a waiting position to a position over the opening 422. Thus, the lid 504 is arranged on the opening 422.

Figure 6A:
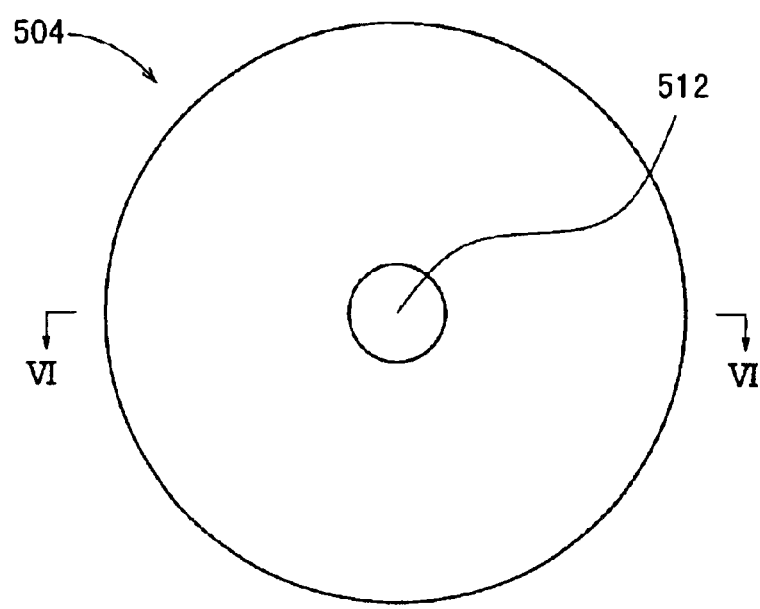
FIG. 6A shows an upper surface of the lid used in the first embodiment.
Figure 6B:
FIG. 6B shows a sectional view taken along a line VI—VI.

As shown in FIGS. 6A and 6B, the lid 504 is a disk made of stainless steel having the circular opening 512 at the central portion. When the lid 504 is arranged on the opening 422, the clean air, which is fed from an unillustrated air-conditioning system through a HEPA filter, is introduced into the spinner head apparatus 402 through the circular opening 512.

The circular opening 512 has its opening area which is smaller than that of the opening 422. Accordingly, the clean air can be allowed to flow substantially uniformly toward the entire surface of the recording layer formed on the substrate 202. Therefore, the recording layer can be dried to give a uniform film thickness. Thus, it is possible to produce the information-recording medium having good recording characteristics.

In the case of the conventional technique, it has been necessary to increase the environmental temperature for drying the recording layer or the temperature of the substrate itself, rotate the substrate at a higher speed by increasing the concentration of the dye solution, or increase the air blow speed during the drying. However, in the first embodiment, the foregoing necessity disappears, and it is possible to shorten the drying time for the recording layer. As a result, it is possible to remarkably suppress the increase in running cost, and it is possible to improve the throughput of the information-recording medium.

Explanation will now be made for several modified embodiments of the lid 504 to be used in the first embodiment with reference to FIGS. 7A to 12B.

Figure 7A:
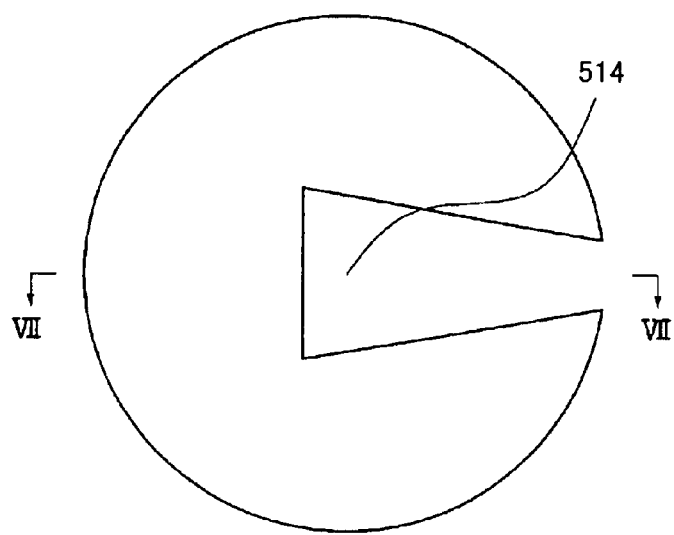
FIG. 7A shows an upper surface of a lid according to a first modified embodiment.
Figure 7B:
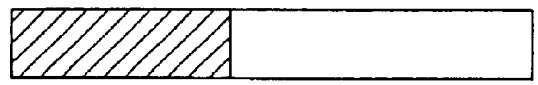
FIG. 7B shows a sectional view taken along a line VII—VII.

As shown in FIGS. 7A and 7B, a lid 504 according to a first modified embodiment has a wedge-shaped opening 514.

Figure 8A:
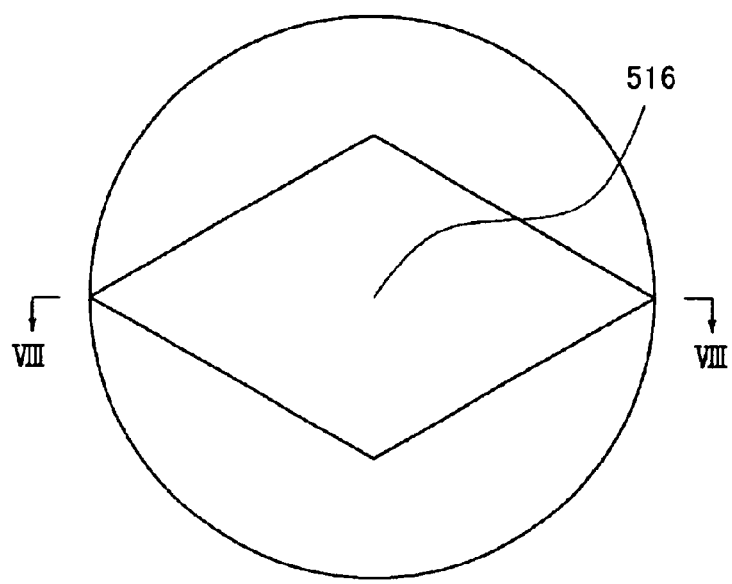
FIG. 8A shows an upper surface of a lid according to a second modified embodiment.
Figure 8B:
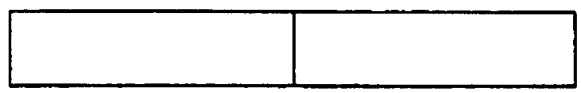
FIG. 8B shows a sectional view taken along a line VIII—VIII.

As shown in FIGS. 8A and 8B, a lid 504 according to a second modified embodiment has a substantially rhombic opening 516.

Figure 9A:
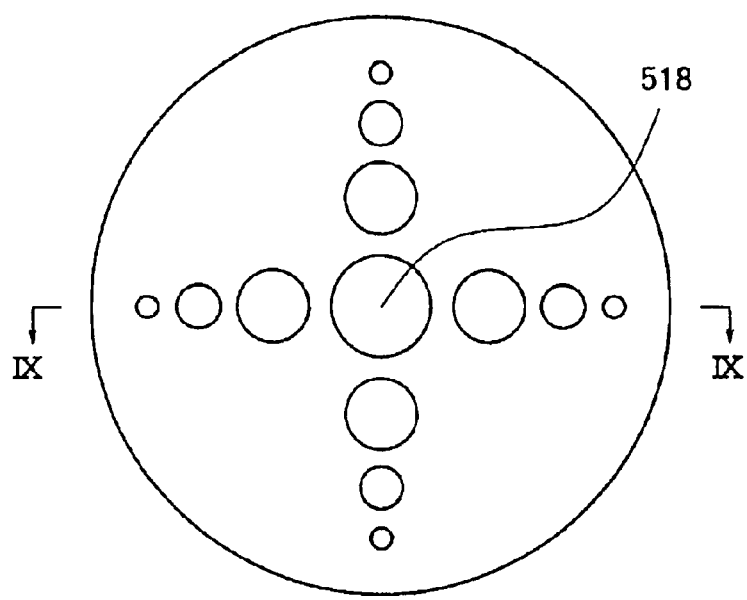
FIG. 9A shows an upper surface of a lid according to a third modified embodiment.
Figure 9B:
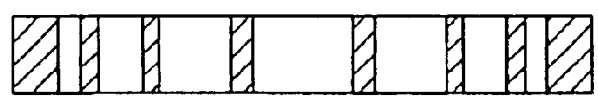
FIG. 9B shows a sectional view taken along a line IX—IX.

As shown in FIGS. 9A and 9B, a lid 504 according to a third modified embodiment has a first opening 518 which has a large diameter at a central portion, and it has a plurality of second openings which have diameters gradually decreased for those disposed in a direction toward an outer circumference in which a central angle resides in a spacing distance of 90°.

Figure 10A:
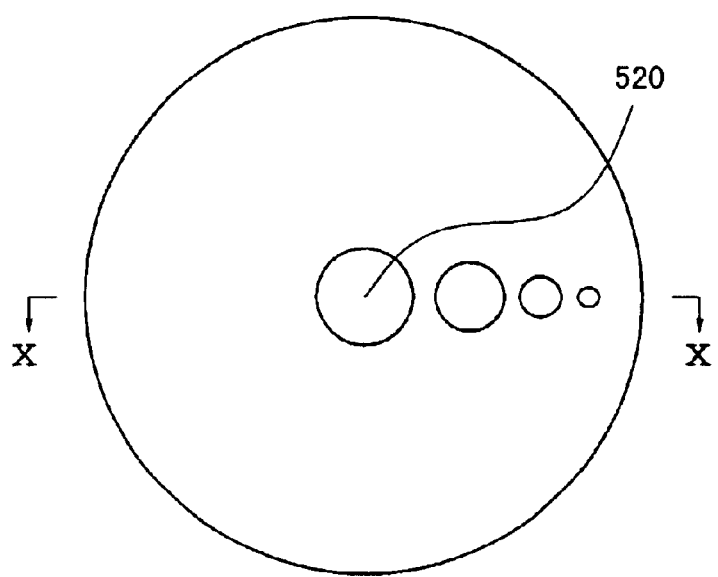
FIG. 10A shows an upper surface of a lid according to a fourth modified embodiment.
Figure 10B:
FIG. 10B shows a sectional view taken along a line X—X.

As shown in FIGS. 10A and 10B, a lid 504 according to a fourth modified embodiment has a first opening 520 which has a large diameter at a central portion, and it has a plurality of second openings which have diameters gradually decreased for those disposed in a direction toward an outer circumference in which a central angle is 360°.

Figure 11A:
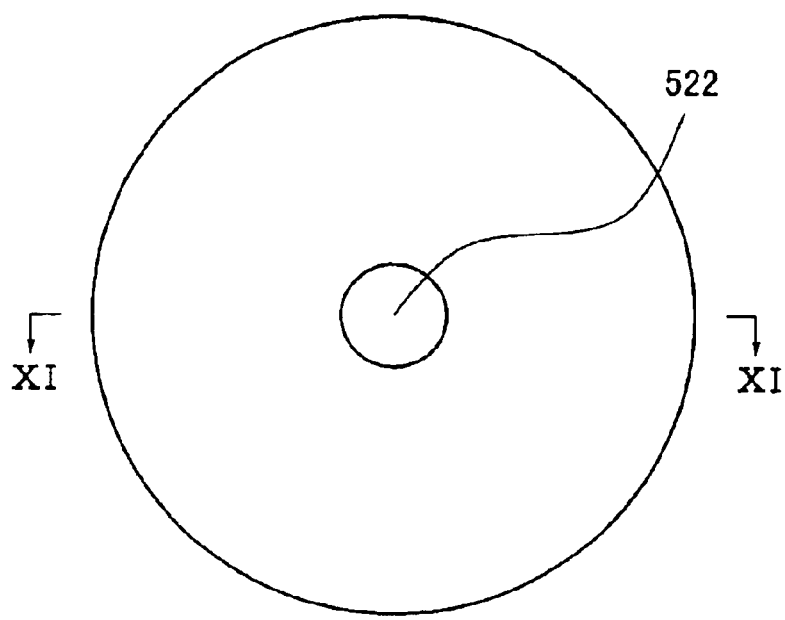
FIG. 11A shows an upper surface of a lid according to a fifth modified embodiment.
Figure 11B:
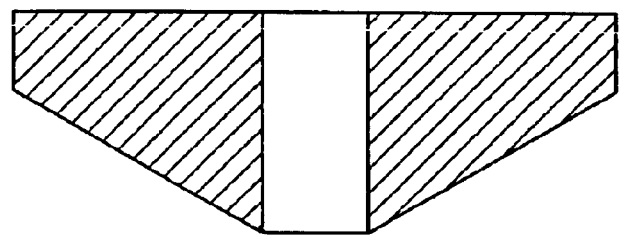
FIG. 11B shows a sectional view taken along a line XI—XI.

As shown in FIGS. 11A and 11B, a lid 504 according to a fifth modified embodiment is formed to have a substantially conical configuration which has a diameter continuously decreased downwardly, and it has an opening 522 at a central portion.

Figure 12A:
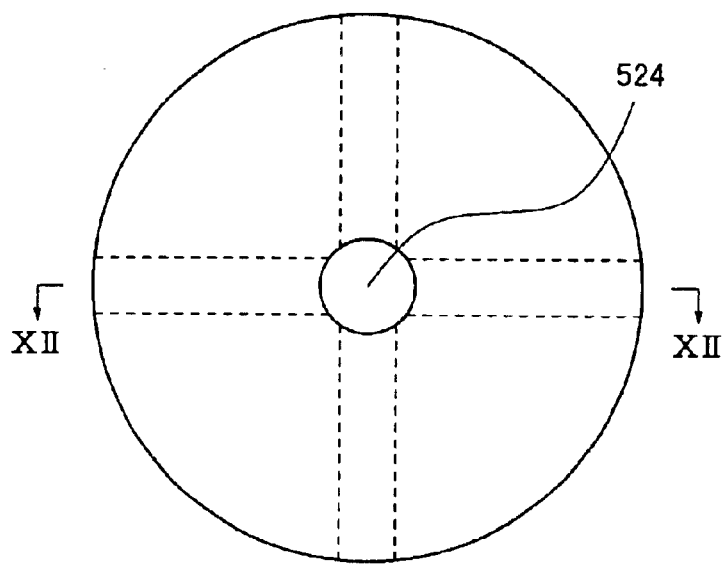
FIG. 12A shows an upper surface of a lid according to a sixth modified embodiment.
Figure 12B:
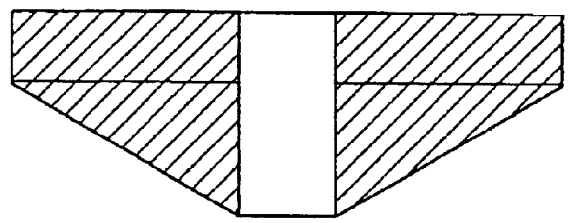
FIG. 12B shows a sectional view taken along a line XII—XII.

As shown in FIGS. 12A and 12B, a lid 504 according to a sixth modified embodiment has a circular opening 524 at a central portion, and it has a plurality of fins which are formed at a lower surface in which a central angle resides in a spacing distance of 90°.

Also in the first to sixth modified embodiments described above, the film thickness of the recording layer can be made uniform, and it is possible to produce the information-recording medium having good recording characteristics.

The local ventilation is effected as follows for each of the spin coat apparatuses 52 of the second process unit 32 (see FIG. 1). That is, the clean air, which is introduced through the circular opening 512 provided through the lid 504 arranged on the opening 422 formed at the upper portion of the scattering-preventive wall 404, is allowed to flow against the surface of the substrate 202. Subsequently, the air is exhausted through an exhaust tube 426 which is attached to a lower portion of each of the spinner head apparatuses 402.

Figure 13:
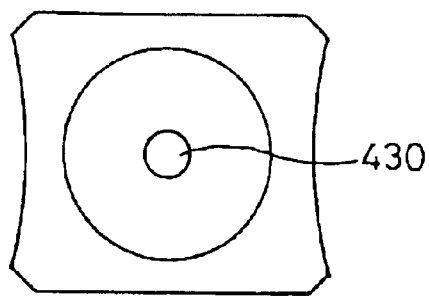
FIG. 13 shows a plan view illustrating a nozzle of the spin coat apparatus.
Figure 14:
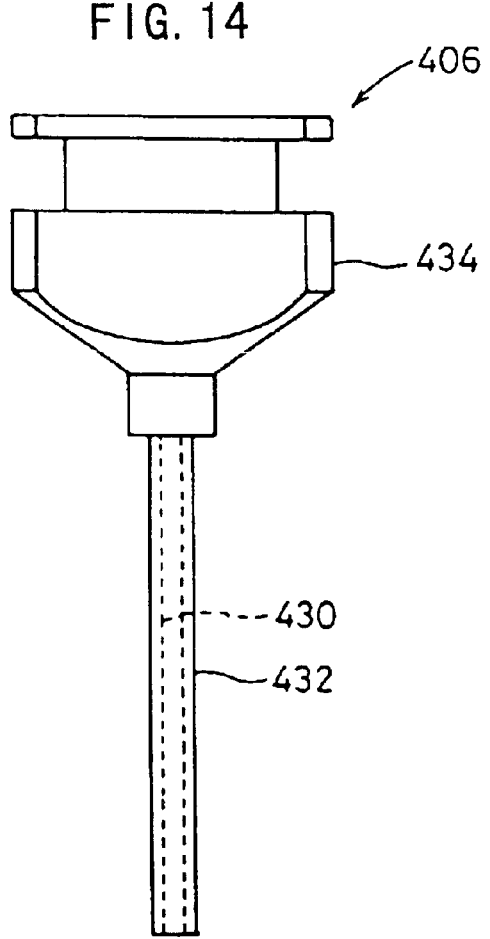
FIG. 14 shows a side view illustrating the exemplary nozzle.

As shown in FIGS. 13 and 14, the nozzle 406 of the application solution-feeding apparatus 400 includes a slender cylindrical main nozzle body 432 having a through-hole 430 formed therethrough in the axial direction, and an attachment section 434 for fixing the main nozzle body 432 to the support plate 410 (see FIG. 3). The main nozzle body 432 has the following surface. That is, the forward end surface 440 and the outer or inner wall surface or both of the outer and inner wall surfaces 442, 444 ranging over a distance of not less than 1 mm from the forward end surface 440 are composed of a fluorine compound. Those usable as the fluorine compound include, for example, polytetrafluoroethylene and polytetrafluoroethylene-containing substances.

Figure 15:
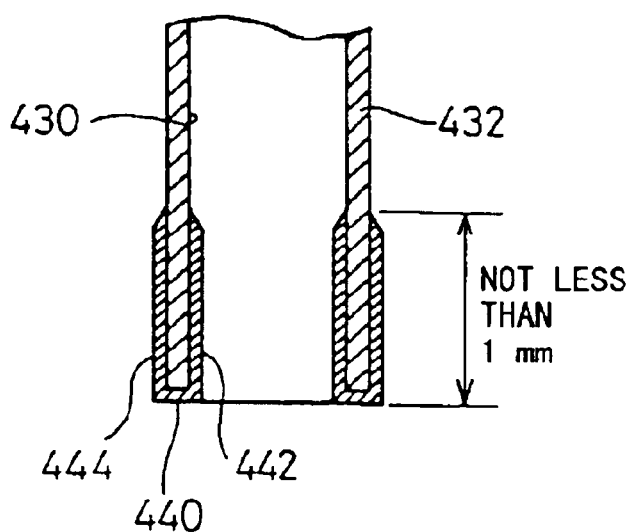
FIG. 15 shows, with partial omission, a magnified side view illustrating another exemplary nozzle.

Preferred examples of the nozzle 406 to be used in this embodiment include, for example, the nozzle 406 in which the portion, which includes the forward end surface of the main nozzle body 432 and which ranges over a distance of not less than 1 mm from the forward end surface, is formed by using the fluorine compound as shown in FIG. 14, and a nozzle 406 in which the portion, which includes the forward end surface 440 of the main nozzle body 432 and which includes the outer or inner wall surface or both of the outer and inner wall surfaces 442, 444 ranging over a distance of not less than 1 mm from the forward end surface 440, is coated with the fluorine compound as shown in FIG. 15.

When the portion, which includes the forward end surface 440 of the main nozzle body 432 and which ranges over the distance of not less than 1 mm from the forward end surface 440, is formed of the fluorine compound, the following arrangement is preferable from a practical viewpoint considering, for example, the strength. That is, for example, the main nozzle body 432 is formed of stainless steel. Further, the forward end surface 440 and the portion ranging over a distance of 5 mm at the maximum from the forward end surface 440 are formed of the fluorine compound.

When the portion, which includes the forward end surface 440 of the main nozzle body 432 and which includes the outer or inner wall surface or both of the outer and inner wall surfaces 442, 444 ranging over the distance of not less than 1 mm from the forward end surface 440, is coated with the fluorine compound as shown in FIG. 15, it is preferable that an area ranging over a distance of not less than 10 mm from the forward end surface 440 of the main nozzle body 432 is coated with the fluorine compound. It is more preferable that the entire area of the main nozzle body 432 is coated with the fluorine compound. When the area as described above is coated, the thickness is not specifically limited. However, the thickness is appropriately within a range of 5 to 500 μm. The material for the main nozzle body 432 is preferably stainless steel as described above. The diameter of the through-hole 430 formed through the main nozzle body 432 is generally within a range of 0.5 to 1.0 mm.

Next, the process for producing the optical disk by using the production system 10A will be explained with reference to FIGS. 16A to 17B for illustrating the steps as well.

Figure 16A:
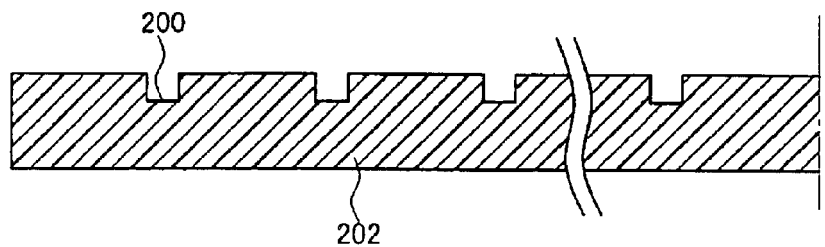
FIG. 16A shows a production step illustrating a state in which a groove is formed on a substrate.

At first, the resin material such as polycarbonate is subjected to injection molding, compression molding, or injection compression molding by using the molding machine 20 of each of the first and second molding equipments 12A, 12B to produce the substrate 202 including the tracking groove or the irregularity (groove) 200 for indicating information such as an address signal, formed on the first principal surface as shown in FIG. 16A.

The material for the substrate 202 includes, for example, polycarbonate, acrylic resin such as polymethyl methacrylate, vinyl chloride-based resin such as polyvinyl chloride and vinyl chloride copolymer, epoxy resin, amorphous polyolefine, and polyester. These materials may be used in combination, if desired. Among the materials described above, it is preferable to use polycarbonate in view of, for example, the moisture resistance, the dimensional stability, and the price. The depth of the groove 200 is preferably within a range of 0.01 to 0.3 μm. The half value width is preferably within a range of 0.2 to 0.9 μm.

The substrate 202, which is taken out of the molding machine 20, is cooled in the cooling section 22 disposed at the downstream stage, and then it is stacked on the stack pole 24 with its first principal surface directed downwardly. At the stage at which a predetermined number of substrates 202 are stacked on the stack pole 24, the stack pole 24 is taken out of the molding equipment 12A, 12B. The stack pole 24 is transported to the subsequent application equipment 14, and it is accommodated in the stack pole-accommodating section 40 of the application equipment 14. The transport may be carried out by using a cart, or it may be carried out by using a self-propelled automatic transport apparatus.

At the stage at which the stack pole 24 is accommodated in the stack pole-accommodating section 40, the first transport mechanism 42 is operated. The substrate 202 is taken out of the stack pole 24 one by one, and it is transported to the electrostatic blow mechanism 44 disposed at the downstream stage. The static electricity is removed by the electrostatic blow mechanism 44 from the substrate 202 transported to the electrostatic blow mechanism 44. After that, the substrate 202 is transported by the second transport mechanism 46 to the subsequent dye application mechanism 48. The substrate 202 is introduced into any one of the spin coat apparatuses 52 of the six spin coat apparatuses 52. The dye solution is applied onto the first principal surface of the substrate 202 introduced into the spin coat apparatus 52. Subsequently, the substrate 202 is rotated at a high speed.

At this time, the application solution-drying apparatus 502, which is arranged to form the pair with the spin coat apparatus 52, is operated to arrange the lid 504 on the opening 422 formed at the upper portion of the scattering-preventive wall 404 for constructing the spinner head apparatus 402. After that, the substrate 202 is rotated at the high speed.

Figure 16B:
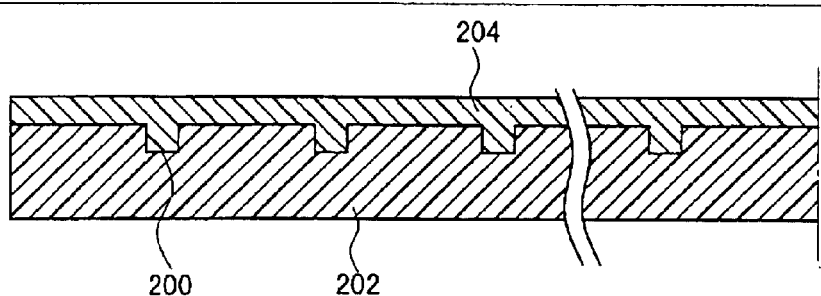
FIG. 16B shows a production step illustrating a state in which a dye recording layer is formed on the substrate.

In this case, the clean air can be allowed to flow substantially uniformly toward the dye solution on the substrate from the circular opening 512 provided through the lid 504. Therefore, the drying treatment is applied so that the thickness of the dye solution is uniform. Accordingly, as shown in FIG. 16B, the dye recording layer 204 is formed on the first principal surface of the substrate 202.

That is, the substrate 202, which is introduced into the spin coat apparatus 52, is installed to the spinner head apparatus 402 shown in FIG. 2, and it is held horizontally by the aid of the fixture 420. Subsequently, the dye solution is supplied from the pressurizing tank, and a predetermined amount of the dye solution is adjusted by the aid of the discharge amount-adjusting valve 408. The dye solution is dripped via the nozzle 406 onto the inner circumferential side of the substrate 202.

As described above, the nozzle 406 has the following surface. That is, the portion, which includes the forward end surface 440 of the main nozzle body 432 and the outer or inner wall surface or both of the outer and inner wall surfaces 442, 444 ranging over the distance of not less than 1 mm from the forward end surface 440, is composed of the fluorine compound. Therefore, the adhesion of the dye solution scarcely occurs, and the deposition and the deposit of the dye are scarcely formed, which would be otherwise caused when the dye solution is dried. Therefore, the applied film can be smoothly formed without causing any trouble such as any defect.

A dye solution, which is obtained by dissolving the dye in an appropriate solvent, is used as the dye solution. The concentration of the dye in the dye solution is generally within a range of 0.01 to 15% by weight, preferably within a range of 0.1 to 10% by weight, especially preferably within a range of 0.5 to 5% by weight, and most preferably within a range of 0.5 to 3% by weight.

Simultaneously with the completion of the dripping of the dye solution, the substrate 202, which is held by the spinner head apparatus 402, is rotated at the high speed by the aid of the driving motor. Accordingly, the dye solution, which is dripped onto the substrate 202, is subjected to casting in the direction toward the outer circumference on the surface of the substrate 202, and it arrives at the outer circumferential edge of the substrate 202 while forming the applied film. The excessive dye solution, which arrives at the outer circumferential edge, is spun out by the centrifugal force, and it is scattered toward the surroundings of the edge of the substrate 202. The scattered excessive dye solution collides with the scattering-preventive wall 404, and it is gathered in the saucer provided thereunder. After that, the excessive dye solution is recovered through the drain 424.

Simultaneously with the start of the rotation of the substrate 202 at the high speed, the handling mechanism 414, which constitutes the application solution-feeding apparatus 400, is operated to swing the nozzle 406 from the position over the substrate 202 to the waiting position. Simultaneously with the swinging movement of the nozzle 406 to the waiting position effected by the handling mechanism 414, the driving motor 510, which constitutes the application solution-drying apparatus 502, starts the driving. Accordingly, the arm 508 is subjected to the swinging movement up to the position over the opening 422. The lid 504, which is held by the suction pads 506a to 506d at the forward end of the arm 508, is arranged on the opening 422.

The clean air, which is fed through the HEPA filter from the unillustrated air-conditioning system, is introduced into the spinner head apparatus 402 through the circular opening 512 provided at the central portion of the lid 504 during the period from the application process to the drying process. In this procedure, it is preferable that the flow rate of the clean air to be fed is set to be about 0.1 m/s, and the flow rate of the air to be discharged through the discharge tube 426 is set to be about 0.5 m/s to 1.0 m/s.

When the opening 422 is compared with the circular opening 512, the opening area of the circular opening 512 is smaller than that of the opening 422. Accordingly, when the clean air is introduced through the circular opening 512, the clean air can be allowed to flow substantially uniformly toward the entire surface of the recording layer formed on the substrate 202. Therefore, the recording layer can be dried while making the film thickness to be uniform. Thus, it is possible to produce the information-recording medium having good recording characteristics.

Further, the drying time for the recording layer can be shortened without increasing the environmental temperature for drying the recording layer or the temperature of the substrate itself, without rotating the substrate at a higher speed by increasing the concentration of the dye solution, or without increasing the air blow speed during the drying. Therefore, it is possible to remarkably suppress the increase in running cost. Further, it is possible to improve the throughput of the information-recording medium.

In general, the thickness of the applied film (dye recording layer 204) is within a range of 20 to 500 nm, and preferably within a range to 50 to 300 nm.

In the present invention, the dye to be used for the dye recording layer 204 is not specifically limited. Those usable as the dye include, for example, cyanine dye, phthalocyanine dye, imidazoquinoxaline dye, pyrylium dye, thiopyrylium dye, azulenium dye, squalirium dye, metal complex dye based on, for example, Ni or Cr, naphthoquinone dye, anthraquinone dye, indophenol dye, indoaniline dye, triphenylmethane dye, merocyanine dye, oxonol dye, aminium dye, diimmonium dye, and nitroso compound. Among these dyes, it is preferable to use cyanine dye, phthalocyanine dye, azulenium dye, squalirium dye, oxonol dye, and imidazoquinoxaline dye.

The solvent of the application agent for forming the dye recording layer 204 includes, for example, ester such as butyl acetate and cellosolve acetate; ketone such as methyl ethyl ketone, cyclohexanone, and methyl isobutyl ketone; chlorinated hydrocarbon such as dichloromethane, 1,2-dichloroethane, and chloroform; amide such as dimethylformamide, hydrocarbon such as cyclohexane; ether such as tetrahydrofuran, ethyl ether, and dioxane; alcohol such as ethanol, n-propanol, isopropanol, n-butanol, and diacetone alcohol; fluorine solvent such as 2,2,3,3,- tetrafluoro-1-propanol, and glycol ether such as ethylene glycol monomethyl ether, ethylene glycol monoethyl ether, and propylene glycol monomethyl ether.

The solvent may be used singly or in combination of two or more species in an appropriate manner considering the dissolving property of the dye to be used. Preferably, the fluorine solvent such as 2,2,3,3,-tetrafluoro-1-propanol is used. An anti-fading agent and a binder may be added to the dye solution, if desired. Further, a variety of additives such as an antioxidant, a UV-absorbing agent, a plasticizer, and a lubricant may be added to the dye solution depending on the purpose of the use.

Representative examples of the anti-fading agent include nitroso compound, metal complex, diimmonium salt, and aminium salt. These examples are described, for example, in respective patent documents such as Japanese Laid-Open Patent Publication Nos. 2-300288, 3-224793, and 4-146189.

The binder includes, for example, natural organic high-molecular compound such as gelatin, cellulose derivative, dextran, rosin, and rubber; and synthetic organic high-molecular compound including, for example, hydrocarbon resin such as polyethylene, polypropylene, polystyrene, and polyisobutylene, vinyl resin such as polyvinyl chloride, polyvinyl vinylidene, and polyvinyl chloride-polyvinyl acetate copolymer, acrylic resin such as polymethyl acrylate and polymethyl methacrylate, polyvinyl alcohol, chlorinated polyethylene, epoxy resin, butylal resin, rubber derivative, and initial condensate of thermosetting resin such as phenol-formaldehyde resin.

When the binder is used, the binder is generally used in an amount of not more than 20 parts by weight, preferably not more than 10 parts by weight, and more preferably not more than 5 parts by weight with respect to 100 parts by weight of the dye.

An undercoat layer may be provided on the surface of the substrate 202 on the side on which the dye recording layer 204 is formed, for example, in order to improve the flatness, improve the adhesive force, and avoid the deterioration of quality of the dye recording layer 204.

The material for the undercoat layer includes, for example, high-molecular compound such as polymethyl methacrylate, acrylic acid-methacrylic acid copolymer, styrene-maleic anhydride copolymer, polyvinyl alcohol, N-methylol acrylamide, styrene-vinyltoluene copolymer, chlorosulfonated polyethylene, nitrocellulose, polyvinyl chloride, chlorinated polyolefine, polyester, polyimide, vinyl acetate-vinyl chloride copolymer, ethylene-vinyl acetate copolymer, polyethylene, polypropylene, and polycarbonate; and surface modifier such as silane coupling agent.

The undercoat layer can be formed such that the foregoing substance is dissolved or dispersed in an appropriate solvent to prepare a dye solution, and then the dye solution is applied to the surface of the substrate 202 by utilizing an application method such as spin coat, dip coat, and extrusion coat. The layer thickness of the undercoat layer is generally within a range of 0.005 to 20 μm, and preferably within a range of 0.01 to 10 μm.

The substrate 202, on which the dye recording layer 204 is formed, is transported by the third transport mechanism 50 to the subsequent back surface-washing mechanism 54 to wash the surface (back surface) on the side opposite to the first principal surface of the substrate 202. After that, the substrate 202 is transported by the fourth transport mechanism 56 to the subsequent numbering mechanism 58. The stamping such as a lot number is made on the first principal surface or the back surface of the substrate 202.

After that, the substrate 202 is transported by the fifth transport mechanism 60 to the subsequent inspecting mechanism 62 to inspect the presence or absence of any defect of the substrate 202 and the film thickness of the dye recording layer 204. The inspection is performed by radiating light onto the back surface of the substrate 202, and effecting image processing for the transmitted state of light by using, for example, a CCD camera. The result of inspection obtained by the inspecting mechanism 62 is sent to the subsequent sorting mechanism 68.

The substrate 202, which has been completed for the inspection process described above, is sorted and transported by the sorting mechanism 68 to the stack pole 64 for normal products or the stack pole 66 for NG on the basis of the inspection result.

At the stage at which a predetermined number of substrates 202 are stacked on the stack pole 64 for normal products, the stack pole 64 for normal products is taken out of the application equipment 14, and it is transported to the subsequent aftertreatment equipment 16. The stack pole 64 is accommodated in the stack pole-accommodating section 80 of the aftertreatment equipment 16. The transport may be carried out by using a cart, or it may be carried out by using a self-propelled automatic transport apparatus.

At the stage at which the stack pole 64 for normal products is accommodated in the stack pole-accommodating section 80, the sixth transport mechanism 82 is operated. The substrate 202 is taken out of the stack pole 64 one by one, and it is transported to the first electrostatic blow mechanism 84 disposed at the downstream stage. The static electricity is removed by the first electrostatic blow mechanism 84 from the substrate 202 transported to the first electrostatic blow mechanism 84. After that, the substrate 202 is transported by the seventh transport mechanism 86 to the subsequent sputtering mechanism 88.

Figure 16C:
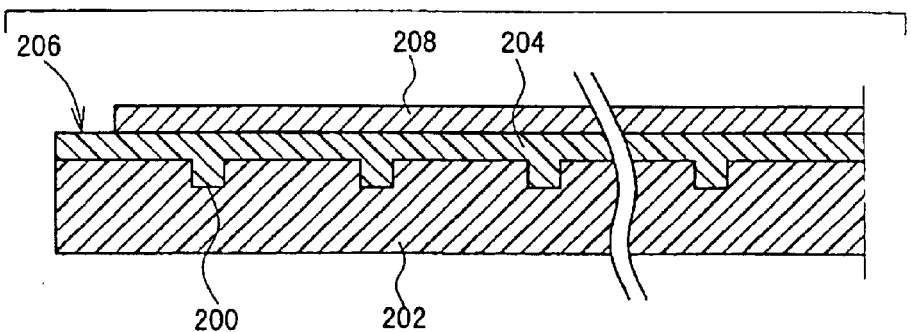
FIG. 16C shows a production step illustrating a state in which a light-reflective layer is formed on the substrate.

As shown in FIG. 16C, the light-reflective layer 208 is formed by sputtering on the entire surface except for the circumferential edge portion 206 of the first principal surface of the substrate 202 introduced into the sputtering mechanism 88.

The light-reflective substance, which is the material for the light-reflective layer 208, is a substance having a high reflectance with respect to the laser beam. The light-reflective substance includes, for example, stainless steel, metalloid, and metal such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi.

Among them, it is preferable to use Cr, Ni, Pt, Cu, Ag, Au, Al, and stainless steel. The substances may be used singly or in combination of two or more species. Alternatively, the substances may be used as an alloy. It is especially preferable to use Ag or an alloy thereof.

The light-reflective layer 208 can be formed on the recording layer 204, for example, by performing vapor deposition, sputtering, or ion plating for the light-reflective substance described above. The layer thickness of the reflective layer is generally within a range of 10 to 800 nm, preferably within a range of 20 to 500 nm, and more preferably within a range of 50 to 300 nm.

Figure 17A:
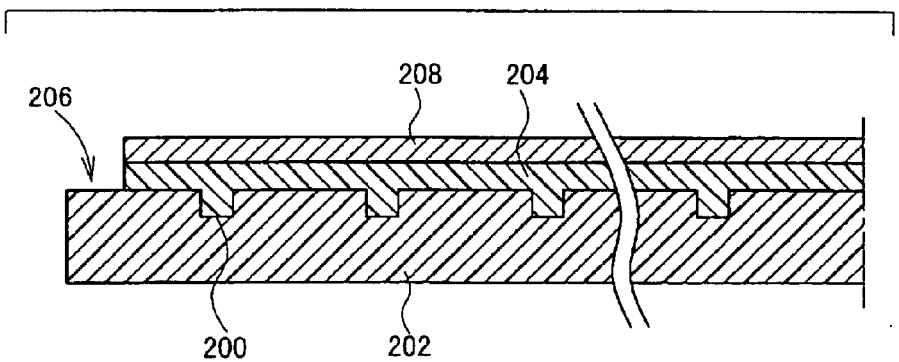
FIG. 17A shows a production step illustrating a state in which an edge portion of the substrate has been washed.

The substrate 202, on which the light-reflective layer 208 is formed, is transported by the eighth transport mechanism 90 to the subsequent edge-washing mechanism 92. As shown in FIG. 17A, the edge portion 206 on the first principal surface of the substrate 202 is washed to remove the dye recording layer 204 having been formed on the edge portion 206. After that, the substrate 202 is transported by the ninth transport mechanism 102 to the subsequent second electrostatic blow mechanism 94 to remove the static electricity.

After that, the substrate 202 is transported by the ninth transport mechanism 102 as well to the UV-curable solution-applying mechanism 96. The UV-curable solution is dripped onto a part of the first principal surface of the substrate 202. After that, the substrate 202 is transported by the ninth transport mechanism 102 as well to the subsequent spin mechanism 98. The substrate 202 is rotated at a high speed. Thus, the application thickness of the UV-curable solution dripped onto the substrate 202 is made uniform over the entire surface of the substrate 202.

In the first embodiment, the time schedule is managed such that the period of time is not less than 2 seconds and within 5 minutes after the film of the light-reflective layer 208 is formed until the UV-curable solution is applied.

Figure 17B:
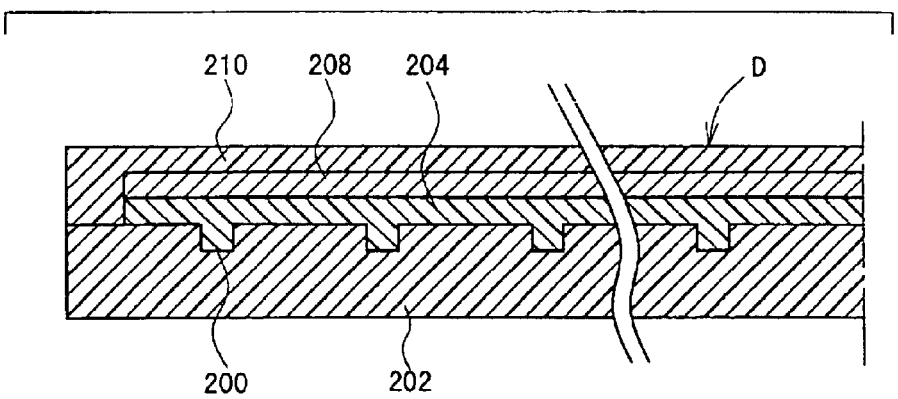
FIG. 17B shows a production step illustrating a state in which a protective layer is formed on the substrate.

After that, the substrate 202 is transported by the ninth transport mechanism 102 as well to the subsequent UV-radiating mechanism 100. The ultraviolet light is radiated onto the UV-curable solution on the substrate 202. Accordingly, as shown in FIG. 17B, the protective layer 210 composed of the UV-curable resin is formed so that the light-reflective layer 208 and the dye recording layer 204 formed on the first principal surface of the substrate 202 are covered therewith. Thus, the optical disk D is constructed.

The protective layer 210 is provided on the light-reflective layer 208 in order that the dye recording layer 204 or the like is protected physically and chemically. The protective layer 210 may be also provided on the side of the substrate 202 on which the dye recording layer 204 is not provided, in order to enhance the scratch resistance and the moisture resistance. The material usable for the protective layer 210 includes, for example, inorganic substance such as SiO, $SiO_2$, $MgF_2$, $SnO_2$, and $Si_3N_4$; and organic substance such as thermoplastic resin, thermosetting resin, and UV-curable resin.

The protective layer 210 can be formed, for example, by laminating a film obtained by extrusion of plastic, onto the light-reflective layer 208 and/or the substrate 202 by the aid of an adhesive. Alternatively, the protective layer 210 may be provided by means of another method such as vacuum deposition, sputtering, and application. When a thermoplastic resin or a thermosetting resin is used, the protective layer 210 can be also formed by dissolving the resin in an appropriate solvent to prepare an application solution, and then applying the application solution, followed by being dried.

In the case of the UV-curable resin, the protective layer 210 can be formed as described above by using the resin as it is or dissolving the resin in an appropriate solvent to prepare an application solution, and then applying the application solution, followed by being irradiated with UV light to cure the resin. A variety of additives such as an antistatic agent, an antioxidant, and a UV-absorbing agent may be further added to the application solution depending on the purpose of the use. The layer thickness of the protective layer 210 is generally within a range of 0.1 to 100 $\mu$m.

After that, the optical disk D is transported by the tenth transport mechanism 104 to the subsequent defect-inspecting mechanism 106 and the characteristic-inspecting mechanism 108 to inspect the presence or absence of the defect on the surface of the dye recording layer 204 and the surface of the protective layer 210 and the signal characteristic based on the groove 200 formed on the substrate 202 of the optical disk D. These inspections are performed by radiating light onto the both surfaces of the optical disk D respectively, and effecting image processing for the reflected light by using, for example, a CCD camera. The results of inspection obtained by the defect-Inspecting mechanism 106 and the characteristic-inspecting mechanism 108 are sent to the subsequent sorting mechanism 114.

The optical disk D, which has been completed for the defect inspection process and the characteristic inspection process described above, is sorted and transported by the sorting mechanism 114 to the stack pole 110 for normal products or the stack pole 112 for NG on the basis of the respective inspection results.

At the stage at which a predetermined number of optical disks D are stacked on the stack pole 110 for normal products, the stack pole 110 is taken out of the aftertreatment equipment 16, and it is introduced into an unillustrated label-printing step.

As described above, in the production system 10A according to the first embodiment, when the dye recording layer 204 formed on the substrate 202 is dried, then the substrate 202 applied with the dye is rotated at the high speed, and the intake for introducing the clean air is narrowed. Accordingly, the clean air can be allowed to flow substantially uniformly toward the entire surface of the dye recording layer 204 formed on the substrate 202. Therefore, the film thickness of the recording layer can be made uniform, and it is possible to produce the information-recording medium having good recording characteristics.

Further, the drying time for the dye recording layer 204 can be shortened without increasing the environmental temperature for drying the dye recording layer 204 or the temperature of the substrate 202 itself, without rotating the substrate at a higher speed by increasing the concentration of the dye solution, or without increasing the air blow speed during the drying. Therefore, it is possible to remarkably suppress the increase in running cost. Further, it is possible to improve the throughput of the information-recording medium.

An illustrative experiment will now be explained. In this illustrative experiment, respective samples were prepared for Working Examples 1 and 2 and Comparative Examples 1 and 2. The optical disk D was produced by using the production system 10A shown in FIG. 1 to compare a case in which the lid 504 was arranged on the opening 422 formed at the upper portion of the scattering-preventive wall 404 for constructing the spinner head apparatus 402 with a case in which the lid 504 was not arranged, in the dry process for the substrate 202 applied with the dye. On this condition, investigation was made for respective samples concerning the drying time and the film thickness distribution ratio for the inner and outer circumferential portions.

In this experiment, Working Example 1 is illustrative of a case in which the disk-shaped lid 504, which is provided with the opening of 50 mm at the central portion, is arranged after the completion of dripping of the dye solution. Working Example 2 is illustrative of a case in which the disk-shaped lid 504, which is provided with the wedge-shaped opening, is arranged after the completion of dripping of the dye solution.

On the other hand, Comparative Example 1 is illustrative of a case in which no lid is put on after the completion of dripping of the dye solution. Comparative Example 2 is illustrative of a case in which a disk-shaped lid having no opening is arranged after the completion of dripping of the dye solution.

The dye recording layer 204 is formed as follows. 2.65 g of a cyanine dye compound represented by the following general formula (1) and 0.265 g of an anti-fading agent represented by the following general formula (2) are combined and blended, and they are dissolved in 100 cc of 2,2,3,3,-tetrafluoro-1-propanol represented by the following general formula (3) to prepare a dye solution for forming the recording layer.

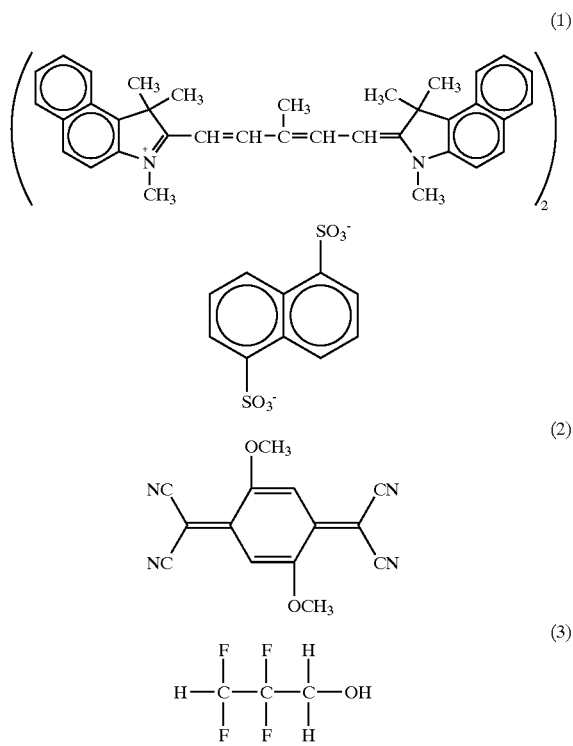

After that, the dye solution is applied by spin coat onto the surface of the groove side of a polycarbonate substrate (diameter: 120 mm, thickness: 1.2 mm) having a spiral-shaped groove 200 (track pitch: 1.6 μm, groove width: 0.4 μm, groove depth: 0.16 μm) formed by injection molding on the surface, while changing the number of revolutions from 300 rpm to 4000 rpm to form the dye recording layer 204 (thickness in the groove: about 200 nm).

Obtained experimental results are shown in FIG. 18. As clearly understood from FIG. 18, in Working Examples 1 and 2, the lid having the opening is arranged during the drying of the dye solution. Accordingly, the drying time for the dye recording layer 204 is shortened, and it is possible to obtain the substantially uniform film thickness for the inner and outer circumferential surfaces.

Further, in Working Examples 1 and 2, the drying time for the dye recording layer 204 can be shortened without increasing the environmental temperature for drying the dye recording layer 204 or the temperature of the substrate 202 itself, without rotating the substrate 202 at a higher speed by increasing the concentration of the dye solution, or without increasing the air blow speed during the drying. Therefore, it is possible to remarkably suppress the increase in running cost. Further, it is possible to improve the throughput of the information-recording medium.

Next, a production system 10B according to a second embodiment of the present invention will be explained with reference to FIG. 19. The same constitutive components of the production system 10B according to the second embodiment as those of the production system 10A according to the first embodiment are designated by the same reference numerals, detailed explanation of which will be omitted. The following description will be made in the same manner as described above.

Figure 19:
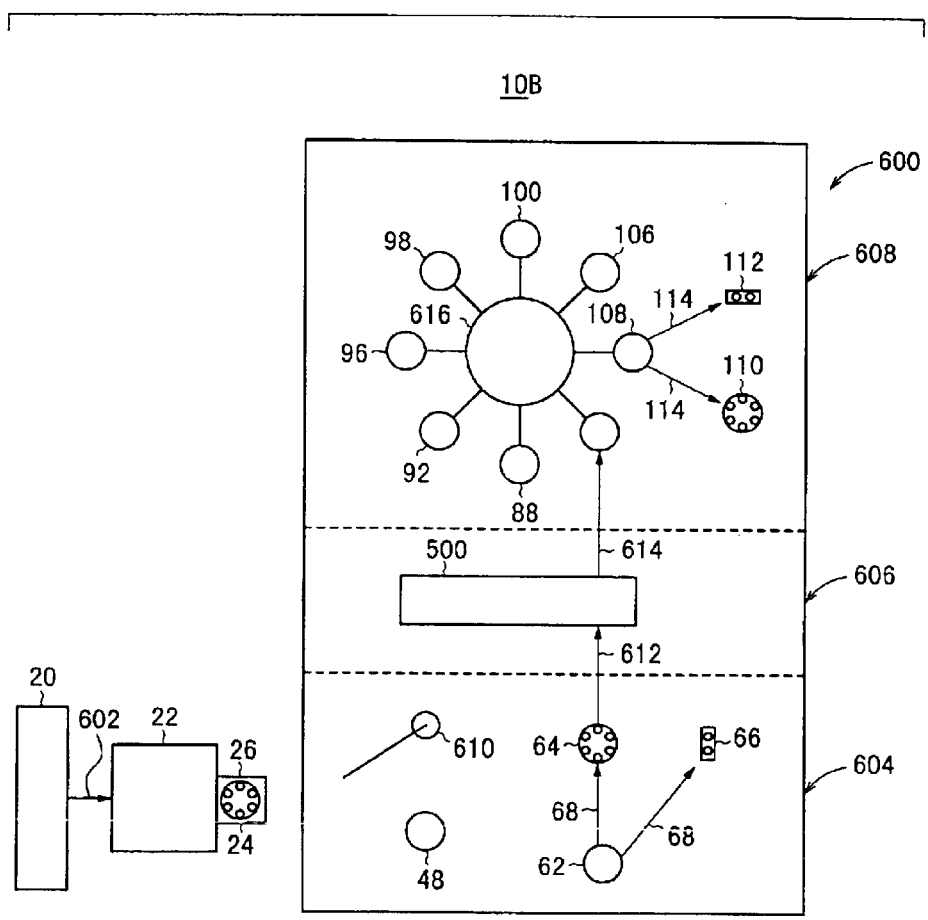
FIG. 19 shows an arrangement of an exemplary production system according to a second embodiment.

As shown in FIG. 19, the production system 10B according to the second embodiment comprises a molding machine 20 for producing the substrate 202, a cooling section 22, and a manufacturing section 600 for producing the optical disk D from the substrate 202 after the cooling treatment.

The substrate 202, which is produced by the molding machine 20, is transported to the cooling section 22 by the aid of a transport mechanism 602. The substrate 202, which is cooled by the cooling section 22, is stacked and stored on the stack pole 24 installed as a plurality of individuals for the stacking section 26 (stack pole rotary table).

The manufacturing section 600 comprises three process units 604, 606, 608. The first process unit 604 includes a dye application mechanism 48 for forming the dye recording layer 204 (see FIG. 13) on the substrate 202 by applying the dye solution onto the first principal surface of the substrate 202 followed by drying, an inspecting mechanism 62 for inspecting the presence or absence of the defect and the film thickness of the dye recording layer 204 after applying the dye solution, and a sorting mechanism 68 for sorting the substrates 202 into those to be stacked on a stack pole 64 for normal products and those to be stacked on a stack pole 66 for NG depending on a result of inspection performed by the inspecting mechanism 62.

The first process unit 604 is further provided with an arm mechanism 610 for taking out the substrate 202 stacked on the stack pole 24 one by one and transporting it to the dye application mechanism 48, and transporting, to the inspecting mechanism 62, the substrate 202 to which the dye solution is applied by the dye application mechanism 48.

The second process unit 606 includes a substrate-drying mechanism 500 for drying the substrate 202 in order to stabilize the light reflectance of the dye recording layer 204 formed on the substrate 202, an eleventh transport mechanism 612 for transporting the substrate 202 from the stack pole 64 for normal products to the substrate-drying mechanism 500, and a twelfth transport mechanism 614 for successively transporting, from the substrate-drying mechanism 500 to the next step, the substrate 202 subjected to the stabilizing treatment for the light reflectance for the dye recording layer 204.

The third process unit 608 includes a sputtering mechanism 88 for forming, by means of sputtering, the light-reflective layer on the dye recording layer 204 of the substrate 202 transported by the twelfth transport mechanism 614, an edge-washing mechanism 92 for washing the circumferential edge (edge portion) of the substrate 202 completed for the sputtering of the light-reflective layer, a UV-curable solution-applying mechanism 96 for applying a UV-curable solution onto the dye recording layer of the substrate 202 subjected to the edge washing, a spin mechanism 98 for rotating, at a high speed, the substrate 202 applied with the UV-curable solution to obtain a uniform application thickness of the UV-curable solution on the substrate 202, a UV-radiating mechanism 100 for radiating ultraviolet light onto the substrate 202 completed for the application of the UV-curable solution and the spin treatment so that the UV-curable solution is cured to form the protective layer on the light-reflective layer of the substrate 202, a defect-inspecting mechanism 106 for inspecting the defect of the applied surface and the protective layer surface of the UV-irradiated substrate 202, a characteristic-inspecting mechanism 108 for inspecting the signal characteristic based on the groove formed on the substrate 202, and a sorting mechanism 114 for sorting the substrates 202 into those to be stacked on a stack pole 110 for normal products and those to be stacked on a stack pole 112 for NG depending on a result of inspection performed by the defect-inspecting mechanism 106 and the characteristic-inspecting mechanism 108.

The third process unit 608 is further provided with a rotary type transport mechanism 616 for successively transporting the substrate 202 one by one to the respective mechanisms, i.e., the sputtering mechanism 88, the edge-washing mechanism 92, the UV-curable solution-applying mechanism 96, the spin mechanism 98, the UV-radiating mechanism 100, the defect-inspecting mechanism 106, and the characteristic-inspecting mechanism 108.

The rotary type transport mechanism 616 has a disk-shaped rotary section at a central portion. The rotary section is provided with eight arms which are disposed at equal intervals. Suction pads for holding the substrate 202 are provided at forward end portions of the eight arms. When the rotary section is rotated, the substrate 202, which is held by the suction pad provided for each of the eight arms, is successively transported to the respective mechanisms 88, 92, 96, 98, 100, 106 which constitute the third process unit 608.

Next, explanation will be made for the process for producing the optical disk by using the production system 10B according to the second embodiment.

At first, the resin material such as polycarbonate is subjected to injection molding, compression molding, or injection compression molding by using the molding machine 20 to produce the substrate 202 including the tracking groove or the irregularity (groove) 200 for indicating information such as an address signal, formed on the first principal surface as shown in FIG. 16A.

The substrate 202, which is taken out of the molding machine 20, is transported by the transport mechanism 602 to the cooling section 22, and it is cooled in the cooling section 22. After that, the substrate 22 is stacked on the stack pole 24 with its first principal surface directed downwardly. The substrate 202, which is stacked on the stack pole 24, is transported successively one by one to the dye application mechanism 48 by the aid of the arm mechanism 610.

The dye solution is applied onto the first principal surface of the substrate 202 transported to the dye application mechanism 48. Subsequently, the substrate 202 is rotated at a high speed to obtain a uniform thickness of the applied solution, and then it is subjected to the drying treatment. Accordingly, as shown in FIG. 16B, the dye recording layer 204 is formed on the first principal surface of the substrate 202.

The substrate 202, on which the dye recording layer 204 is formed, is transported to the inspecting mechanism 62 by the aid of the arm mechanism 610 to perform the inspection for the presence or absence of the defect of the substrate 202 and the film thickness of the dye recording layer 204.

The substrate 202, which is completed for the 111 inspection treatment as described above, is sorted and transported to the stack pole 64 for normal products or the stack pole 66 for NG by the aid of the sorting mechanism 68 on the basis of the result of the inspection.

When the substrate 202 is stacked on the stack pole 64 for normal products, the eleventh transport mechanism 612 is operated simultaneously therewith to take out the substrate 202 one by one from the stack pole 64 and transport it to the substrate-drying mechanism 500. The substrate 202, which is transported to the substrate-drying mechanism 500, is dried in the substrate-drying mechanism 500 to thereby stabilize the light reflectance of the dye recording layer 204 formed on the substrate 202. After that, the substrate 202 is transported to the subsequent sputtering mechanism 88 by the aid of the twelfth transport mechanism 614.

In the second embodiment, the condition of the drying treatment for the substrate 202 performed by the substrate-drying mechanism 500 is managed such that the temperature is 80° C. and the time is 20 minutes.

As shown in FIG. 16C, the light-reflective layer 208 is formed by the sputtering on the entire surface except for the circumferential edge portion 206 of the first principal surface of the substrate 202 introduced into the sputtering mechanism 88.

The substrate 202, on which the light-reflective layer 208 is formed, is transported to the subsequent edge-washing mechanism 92 by the aid of the rotary type transport mechanism 616. As shown in FIG. 17A, the edge portion 206 of the first principal surface of the substrate 202 is washed to remove the dye recording layer 204 having been formed on the edge portion 206.

After that, the substrate 202 is transported to the UV-curable solution-applying mechanism 96 by the aid of the rotary type transport mechanism 616. The UV-curable solution is dripped to a part of the first principal surface of the substrate 202. Subsequently, the substrate 202 is further transported to the subsequently spin mechanism 98 by the aid of the rotary type transport mechanism 616. The substrate is rotated at a high speed to thereby obtain a uniform application thickness of the UV-curable solution dripped on the substrate 202 over the entire surface of the substrate 202.

After that, the substrate 202 is transported to the subsequent UV-radiating mechanism 100 by the aid of the rotary type transport mechanism 616 as well. The UV-curable solution on the substrate 202 is irradiated with the ultraviolet light. Accordingly, as shown in FIG. 17B, the protective layer 210 based on the UV-curable resin is formed to coat the dye recording layer 204 and the light-reflective layer 208 formed on the first principal surface of the substrate 202. Thus, the optical disk D is constructed.

After that, the optical disk D is transported to the subsequent defect-inspecting mechanism 106 and the characteristic-inspecting mechanism 108 by the aid of the rotary type transport mechanism 616 to inspect the presence or absence of the defect of the surface of the dye recording layer 204 and the surface of the protective layer 210 and the signal characteristic based on the groove 200 formed on the substrate 202 of the optical disk D.

The optical disk D, which is completed for the defect-inspecting process and the characteristic-inspecting process as described above, is sorted and transported to the stack pole 110 for normal products or the stack pole 112 for NG by the aid of the sorting mechanism 114 on the basis of the results of the respective inspections.

At the stage at which a predetermined number of optical disks D are stacked on the stack pole 110 for normal products, the stack pole 110 is taken out of the third process unit 608, and it is introduced into an unillustrated label-printing step.

Figure 20:
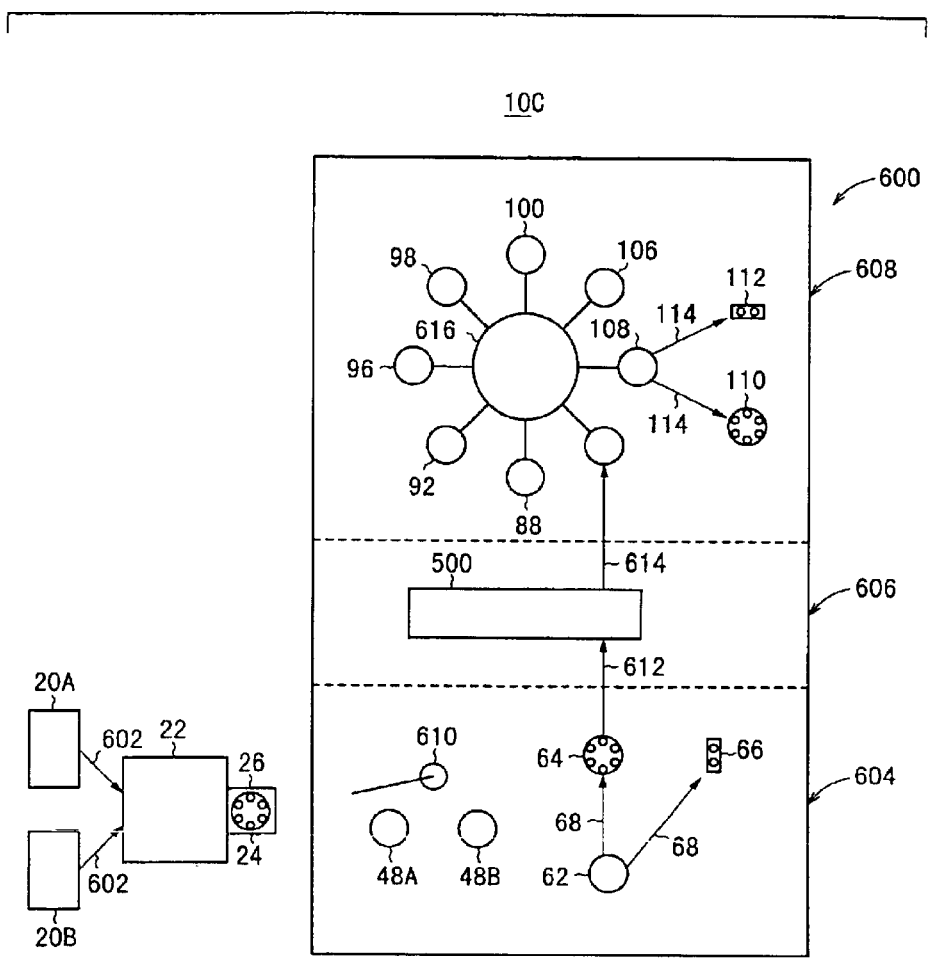
FIG. 20 shows an arrangement of an exemplary production system according to a third embodiment.

As shown in FIG. 20, a production system 10C according to a third embodiment of the present invention comprises two molding machines 20A, 20B, two dye application mechanisms 48A, 48B, and one sputtering mechanism 88.

Figure 21:
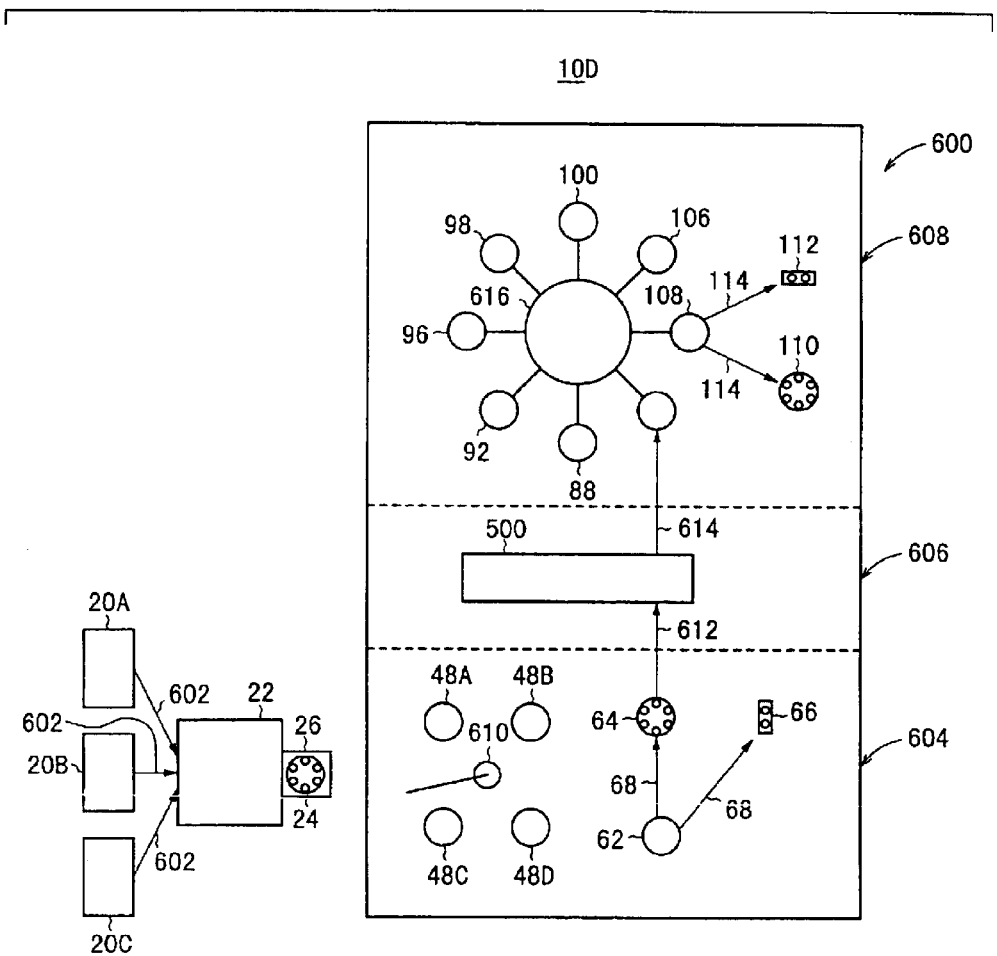
FIG. 21 shows an arrangement of an exemplary production system according to a fourth embodiment.

As shown in FIG. 21, a production system 10D according to a fourth embodiment of the present invention comprises three molding machines 20A, 20B, 20C, four dye application mechanisms 48A, 48B, 48C, 48D, and one sputtering mechanism 88.

Figure 22:
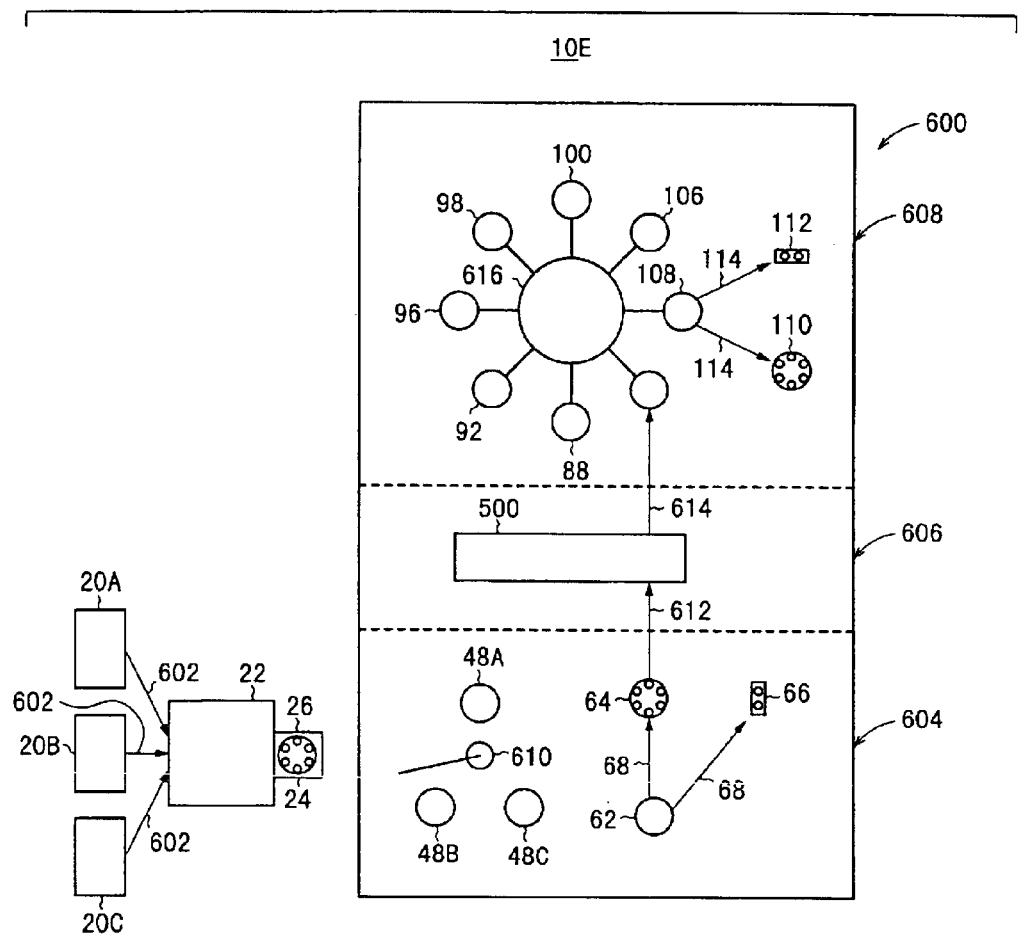
FIG. 22 shows an arrangement of an exemplary production system according to a fifth embodiment.

As shown in FIG. 22, a production system 10E according to a fifth embodiment of the present invention comprises three molding machines 20A, 20B, 20C, three dye application mechanisms 48A, 48B, 48C, and one sputtering mechanism 88.

Figure 23:
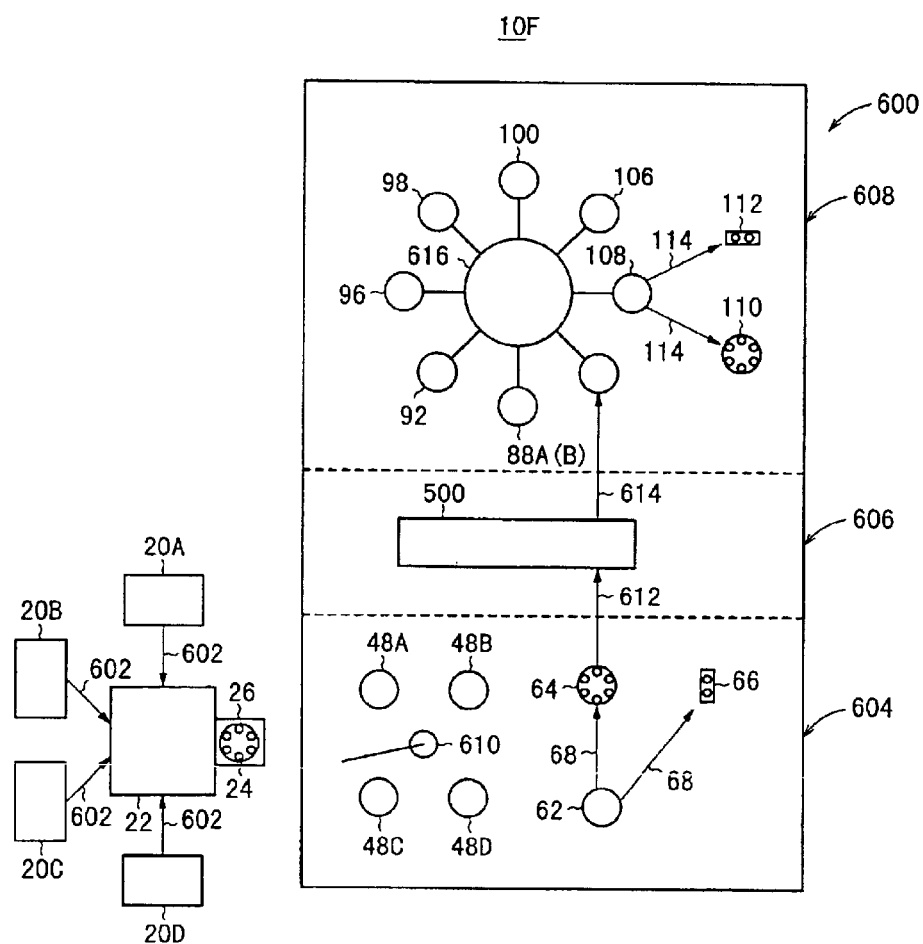
FIG. 23 shows an arrangement of an exemplary production system according to a sixth embodiment.

As shown in FIG. 23, a production system 10F according to a sixth embodiment of the present invention comprises four molding machines 20A, 20B, 20C, 20D, four dye application mechanisms 48A, 48B, 48C, 48D, and two sputtering mechanism 88A, 88B.

Figure 24:
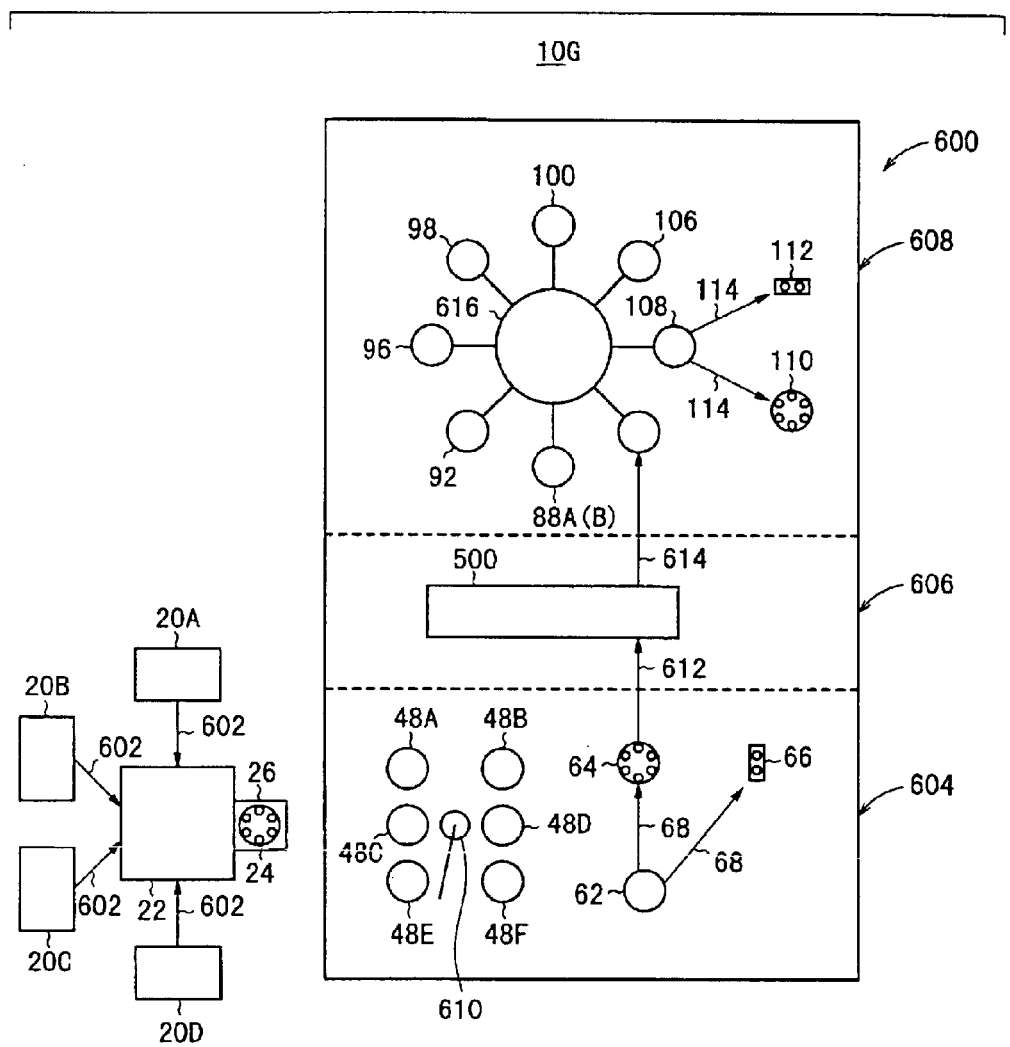
FIG. 24 shows an arrangement of an exemplary production system according to a seventh embodiment.

As shown in FIG. 24, a production system 10G according to a seventh embodiment of the present invention comprises four molding machines 20A, 20B, 20C, 20D, six dye application mechanisms 48A, 48B, 48C, 48D, 48E, 48F, and two sputtering mechanism 88A, 88B.

Figure 25:
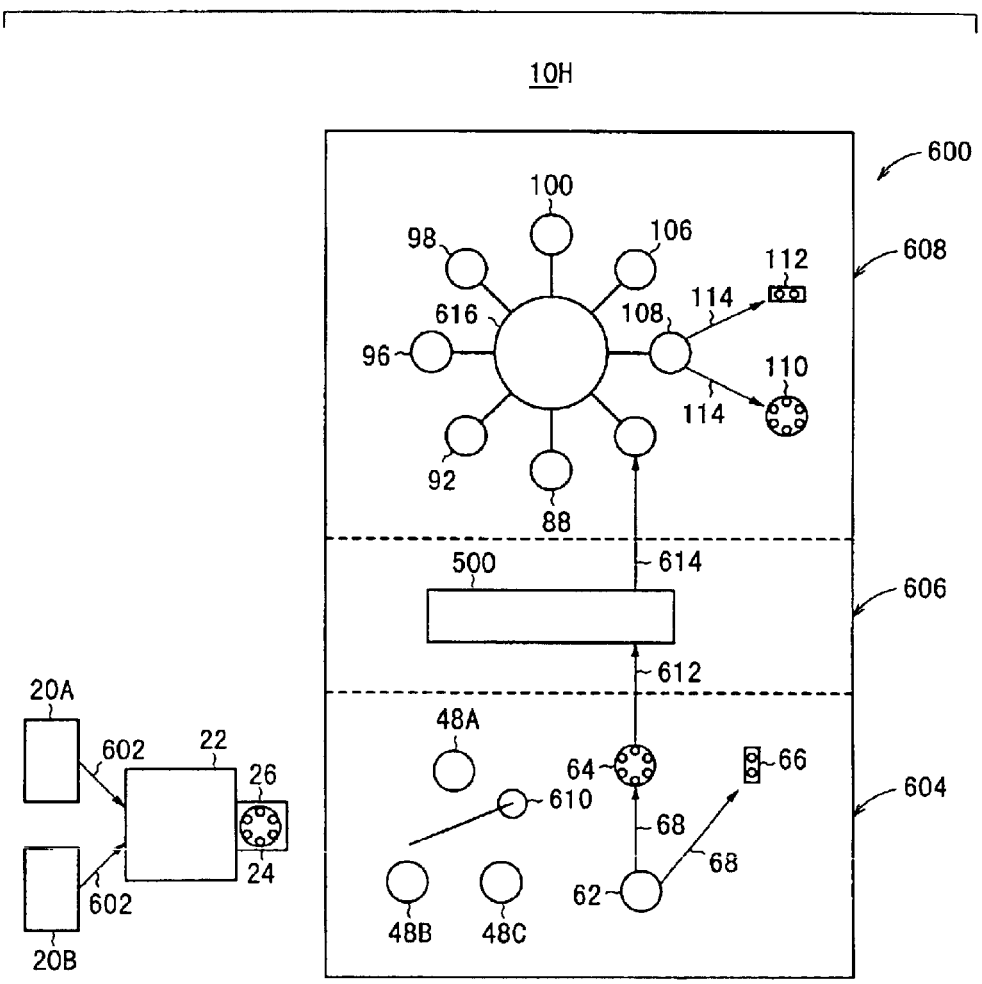
FIG. 25 shows an arrangement of an exemplary production system according to an eighth embodiment.

As shown in FIG. 25, a production system 10H according to an eighth embodiment of the present invention comprises two molding machines 20A, 20B, three dye application mechanisms 48A, 48B, 48C, and one sputtering mechanism 88.

As described above, in the production systems 10B to 10H according to the second to eighth embodiments, the production line is constructed so that the relationship of n/m<2 is satisfied provided that m represents the number of molding machine or machines 20, and n represents the number of dye application mechanism or mechanisms 48 for forming the dye recording layer 204. Therefore, the production line can be simplified, the quality control can be easily performed, and the maintenance cost can be reduced, making it possible to realize a small scale of the production equipment and reduce the installation space so that the low price of the information-recording medium produced thereby may be realized and the improvement in yield may be achieved.

It is a matter of course that the information-recording medium and the method for producing the same according to the present invention are not limited to the embodiments described above, which may be embodied in other various forms without deviating from the gist or essential characteristics of the present invention.

What is claimed is:

1. A method for producing an information-recording medium comprising, on a substrate, a recording layer capable of recording information, said method comprising the steps of:

drying said recording layer by rotating said substrate at a high speed, and allowing clean air to flow toward said recording layer formed on said substrate, through a lid having an opening at least at a central portion and then through an intake, wherein said intake is narrowed by putting said lid having an opening at least at a central portion, on said intake, whereby the lid allows clean air to flow toward the entire surface of the recording layer substantially uniformly to allow the recording layer to be dried uniformly and produce a uniform thickness for the recording layer.

2. The method for producing said information-recording medium according to claim 1, wherein said opening is formed to have a wedge-shaped configuration.

3. The method for producing said information-recording medium according to claim 1, wherein said opening is formed to have a substantially rhombic configuration.

4. The method for producing said information-recording medium according to claim 1, wherein said lid has a first opening which has a large diameter disposed at a central portion, and it has a plurality of second openings which have diameters gradually decreased for those disposed in a direction toward an outer circumference in which a central angle resides in a spacing distance of not less than 10°.

5. The method for producing said information-recording medium according to claim 1, wherein said lid is formed to have a substantially conical configuration which has a diameter continuously decreased downwardly, and it has an opening at a central portion.

6. The method for producing said information-recording medium according to claim 1, wherein said lid has an opening at a central portion, and it has a plurality of fins which are formed at a lower surface in which a central angle resides in a spacing distance of not less than 10°.

* * * * *